(12) United States Patent
Lavezzi

(10) Patent No.: US 10,837,504 B2
(45) Date of Patent: Nov. 17, 2020

(54) BRAKE CALIPER SUPPORT ELEMENT

(71) Applicant: FRENI BREMBO S.P.A., Curno (IT)

(72) Inventor: Roberto Lavezzi, Curno (IT)

(73) Assignee: Freni Brembo S.p.A., Curno (IT)

( * ) Notice: Subject to any disclaimer, the term of this patent is extended or adjusted under 35 U.S.C. 154(b) by 39 days.

(21) Appl. No.: 16/089,412

(22) PCT Filed: Mar. 30, 2017

(86) PCT No.: PCT/IB2017/051811
§ 371 (c)(1),
(2) Date: Sep. 28, 2018

(87) PCT Pub. No.: WO2017/168355
PCT Pub. Date: Oct. 5, 2017

(65) Prior Publication Data
US 2019/0113088 A1 Apr. 18, 2019

(30) Foreign Application Priority Data

Mar. 31, 2016 (IT) .................. 102016000033199

(51) Int. Cl.
*F16D 55/224* (2006.01)
*F16D 65/00* (2006.01)
(Continued)

(52) U.S. Cl.
CPC ....... *F16D 55/224* (2013.01); *F16D 65/0056* (2013.01); *B62L 3/023* (2013.01); *F16D 2055/0008* (2013.01)

(58) Field of Classification Search
CPC .. F16D 55/224; F16D 55/225; F16D 65/0056; F16D 2055/0008; B60L 3/023; B62L 3/023
(Continued)

(56) References Cited

U.S. PATENT DOCUMENTS 2,784,811 A * 3/1957 Butler ................. F16D 55/2255
188/73.43
3,935,927 A * 2/1976 Haraikawa .......... F16D 55/2265
188/73.39
(Continued)

FOREIGN PATENT DOCUMENTS

EP 1085229 A1 3/2001
WO WO/9007443 A1 7/1990

OTHER PUBLICATIONS

European Patent Office, International Search Report with Written Opinion issued in PCT/IB2017/051811, dated Jun. 29, 2017, 8 pages, Rijswijk, Netherlands.

*Primary Examiner* — Thomas J Williams
(74) *Attorney, Agent, or Firm* — Marshall & Melhorn, LLC

(57) ABSTRACT

A brake caliper support element, has a caliper body and at least two tines. Each tine has an element for the connection to the caliper body. Resting counter-surfaces are provided near each element for the connection to the caliper body, which are adapted to couple with connecting seats of the caliper body for a stable and rigid connection between the support element and the caliper body. A stiffening support element connects the two support element tines. The stiffening support element has a stiffening element resting surface for resting and supporting the second pad.

8 Claims, 15 Drawing Sheets

(51) Int. Cl.
*B62L 3/02* (2006.01)
*F16D 55/00* (2006.01)

(58) Field of Classification Search
USPC .................. 188/18 A, 26, 73.39, 370, 73.46
See application file for complete search history.

(56) References Cited

U.S. PATENT DOCUMENTS

| | | |
|---|---|---|
| 4,343,380 A * | 8/1982 | Kawaguchi ............. B60T 1/065 |
| | | 188/18 A |
| 4,465,163 A | 8/1984 | Matsumoto |
| 7,275,624 B2 | 10/2007 | Gogo |
| 7,708,124 B1 | 5/2010 | Rackers et al. |
| 2012/0043168 A1 | 2/2012 | Narayanan, V et al. |

* cited by examiner

BRAKE CALIPER SUPPORT ELEMENT

FIELD OF THE INVENTION

The present invention relates to a support element for a brake caliper.

In particular, in a fixed type disc brake caliper body, the disc brake caliper body does not slide with respect to a support thereof and is adapted to be arranged straddling a floating type brake disc, also known as sliding on a support thereof so as to modify its position along a direction axial thereto to either approach or move away from at least one brake pad. Said brake disc has a first brake disc braking surface and an opposite second brake disc braking surface. The caliper body of the present invention comprises a first elongated element wheel side, i.e. facing the wheel of a vehicle, comprising a first elongated element caliper outer side and a first elongated element caliper inner side, wherein said first elongated element caliper outer side is adapted to face the vehicle wheel. Said caliper body has at least one portion of the first elongated element caliper inner side adapted to face said axially sliding first brake disc braking surface.

Said caliper body further comprises a second elongated element on the side opposed to the wheel having a second elongated element caliper outer side and a second elongated element caliper inner side. At least one portion of the second elongated element caliper inner side is adapted to face said second brake disc braking surface.

Said first elongated element wheel side comprises at least one thrust means seat adapted to receive thrust means adapted to bias a first pad against said first brake disc braking surface, brake disc, which being floating in turn abuts against an opposite second pad by means of its second braking surface, to apply a braking action on the vehicle.

Said first elongated element wheel side comprises at least one sliding element adapted for the relative sliding of said first pad biased by the thrust means with respect to said caliper body.

Said second elongated element on the side opposed to the wheel comprises at least one pad resting surface adapted for the at least partial resting of the second opposed pad firmly against the caliper body, preventing this second pad from being biased by any thrust means movable with respect to the caliper body itself.

Said caliper body comprises at least one connecting bridge of the elongated elements, which bridge is adapted to connect said first elongated element wheel side to said second elongated element on the side opposed to the wheel, so as to be adapted to straddle said brake disc.

Even more particularly, the present invention relates to a brake caliper for a motorcycle or two-wheel motor vehicle, where the side opposite to the wheel is the side facing the outside of the motor vehicle.

PRIOR ART

In a disc brake, the brake caliper is generally arranged straddling the outer peripheral margin of a brake disc, suited to rotate about a rotational axis defining an axial direction (X-X). In a disc brake, a radial direction (R-R), arranged substantially orthogonal to said axial direction (X-X), and a tangential or circumferential direction (C-C), orthogonal to both said axial direction (X-X) and said radial direction (R-R) is further defined.

The brake calipers are constrained to a support structure which remains stationary with respect to the vehicle wheel, such as, for example, a spindle of a vehicle suspension or a vehicle wheel hub or a fork or swingarm of a motor vehicle. The brake caliper usually has a caliper body comprising two elongated portions arranged so as to face opposite braking surfaces of a brake disc, and at least one bridge, which connects said two elongated portions to each other.

In a typical arrangement of a disc brake on a motor vehicle, a braking surface of the brake disc faces towards the outside of the motor vehicle, defining the disc brake outer motor vehicle side, and the opposite braking surface of the brake disc faces towards the motor vehicle wheel, defining the wheel side of the disc brake. So, when the brake caliper is mounted on a brake disc, a first elongated portion of the caliper body is on the outer side of the motor vehicle and a second elongated portion of the caliper body is on wheel side. Clutch pads are provided arranged between each elongated portion of the caliper body and the facing braking surfaces of the brake disc.

In floating caliper bodies associated with fixed discs, a floating portion of the caliper body has a cylinder, or cylinders, adapted to accommodate hydraulic pistons capable of applying a thrust action on the friction pads facing it, abutting it against the braking surface of the disc, while sliding on the bracket, or fixed portion of the caliper, and acts on the second clutch pad abutting it against the brake disc to apply the braking action on the motor vehicle.

In fixed caliper bodies associated with fixed discs, a cylinder, or cylinders, is or are present on both opposite sides of the caliper body, adapted to accommodate hydraulic pistons capable of applying a thrust action on the friction pad facing it, abutting it against the braking surface of the disc, without needing to move the brake disc axially, abutting both opposite brake pads against the opposite braking surfaces of the brake disc to apply the braking action on the motor vehicle.

Otherwise, fixed caliper bodies are also known associated with fixed discs, only one of the elongated portions of the caliper body has a cylinder, or cylinders, adapted to accommodate hydraulic pistons capable of applying a thrust action on the friction pad facing it, abutting it axially against the braking surface of the disc, which in turn slides on its support and abuts against the second clutch pad to apply the braking action on the motor vehicle.

This braking action on the motor vehicle applies a considerable friction adapted to create the desired braking torque on the motor vehicle itself, the braking torque in all cases contextually biases and deforms the caliper body itself away from the brake disc. This phenomenon is known as elastic deformation or "strain" of the caliper, which by moving away from the brake disc forces a further bias of the hydraulic pistons on the pad to apply the desired braking action.

When the braking action ceases, and thus when the bias which deforms the caliper body away from the brake disc ceases, the caliper body returns to its undeformed rest configuration, approaching the brake disc again, and thus approaching the pads to the braking surfaces.

This approaching of the pads to the brake disc is undesired because it determines a contact, albeit minor, between pad and disc, which determines a continuous minor friction and thus a braking action, also known as residual braking torque, also when the braking command by the driver of the vehicle or motor vehicle ceases.

This residual braking torque is often considered undesired because it generates noise, albeit minor, caused by the friction action between pads and disc braking surfaces, an undesired wear of the pads and of the brake disc, which implies more frequent maintenance for their replacement, and a minimum fuel consumption for feeding the drive unit with the energy, even if minimum, needed to overcome this residual torque.

Partially, this phenomenon known as elastic deformation or "strain" of the brake caliper is compensated by providing rollback devices in the piston-cylinder interface, which retract the piston into its cylinder by a limited predetermined entity, moving it away from the respective pad and thus allowing the pad, biased in turn by a spring, to move away from the disc, reducing the undesired residual torque.

However, in the case of fixed calipers coupled with floating or axially sliding discs, these known rollback devices are present only on the side of the caliper provided with thrust means, leaving the opposite side free to be "strained" between the deformed position and the undeformed position, which side approaches the pad again forcing it slightly onto the respective braking surface of the brake disc.

In particular, worth noting is the simultaneous absence of thrust devices, and thus of rollback devices, on the side opposite to the wheel and the provision of a less resistant elongated element, precisely because it is free from the structure which surrounds and accommodates the pad thrust means, which are absent here, and which with their structure increase the local stiffness of the caliper body which thus is more deformed when undergoes the braking action.

However, for automotive applications, and in particular for sports cars with carbon discs suited for braking with violent decelerations only capable of producing the necessary temperature to obtain the required friction, known calipers of this type are described in EP1085229A1, by the applicant, for use in Formula 1, and in WO9007443A1 by ELF France. These known solutions, precisely because they are suited for high-performance sports cars, rarely address the problem of residual torque, which is sometimes seen as a positive factor, not for the residual braking torque, but for the position of the brake pads already abutting on the braking surfaces and thus immediately reactive to the driver's braking command. In other words, on sports cars, the presence of a minor residual torque is accepted in order to have prompt, reactive, immediate braking at the first suggestion of command by the driver, preventing the pad from performing an even minimum approach path to the disc braking surface.

On vehicles for everyday use, instead, the need to reduce the elastic deformation of the caliper body, or "strain" of the caliper body, is strongly felt, above all if the caliper is of fixed type associated with a floating disc, in which the thrust means are provided on a single side of the caliper body itself, in order to either reduce or entirely avoid the contact of the brake pad on the braking surface when the driver's braking command ceases, and thus avoiding the presence of a residual braking torque.

Solution

It is the object of the present invention to solve the drawbacks of the prior art and to provide a solution to the needs of providing a fixed type caliper body suited for floating brake discs, capable of controlling the deformation of the side free from the thrust means, and thus to limit the elastic deformation or "strain" of the caliper body.

A further object is therefore to reduce the residual braking toque of the caliper, reduce the noise of the disc brake in the absence of braking and reduce the pads and brake disc wear.

These and other objects are achieved by a brake caliper support element according to claim 1.

Some advantageous embodiments are the object of the dependent claims.

By providing a brake caliper according to the claims, the need is satisfied to limit the deformation of the caliper body, in its portion free from thrust means, thus reducing the overall deformation, i.e. the movement of the caliper body passing from a biased state and deformed state thereof to a non-biased and undeformed state, either reducing or eliminating, as a consequence, the residual braking torque, as well as the noise generated in unbraked running conditions of the vehicle or motor vehicle and the wear of the braking system and, above all, of the pads and of the brake disc.

Furthermore, by virtue of the suggested solutions, a brake caliper which is easy to assemble on its support system is provided, and thus with easy maintenance of the braking system, because the caliper connecting means are more easily accessible.

Furthermore, by virtue of the suggested solutions, the number of caliper components can be reduced to the advantage of reduced construction complexity and of greater operating reliability.

According to some embodiments, easier maintenance can be achieved by providing the feeding pipe and bleeding valve arranged near the outer side of the elongated elements on the side opposite to the wheel, and thus of rapid and simple access and use.

By virtue of the suggested support element, above all the caliper body portion free from thrust means can be further stiffened. Furthermore, advantageously, in some embodiments, the support directly abuts the pad, making the reaction of the braking action not only more rigid but also allowing a contact and a direct thermal transfer of the heat produced by the braking and present in the pads to the support instead of to the caliper body, with a better disposal thereof.

By virtue of the suggested solutions, the caliper body provides the fixing to a support on one side, or elongated element, and the seat for the thrust means, e.g. a piston, on another side, or elongated element, opposite to and not connected to the support. By virtue of this configuration, the movement of the thrust means can be controlled better and the elastic deformation of the caliper body during the braking steps of the vehicle can be controlled and compensated better, resulting in an accurate "lever point" or position of the braking lever in which the driver feels the braking action at the required intensity and, above all, with a repeatability which confers a high feeling of vehicle driving safety.

By virtue of the suggested solutions, the caliper body provides the thrust means on the side opposite to the support, i.e. on the side of the brake caliper which is more heavily subjected to an elastic deformation when the braking action on the vehicle is applied with the caliper. This arrangement of the thrust means always takes the floating brake disc towards the brake pad resting on the side of the caliper body connected to the caliper support, side which is deformed less as a result of the braking action, ensuring higher control on the effective brake disc position during operation.

The suggested solutions may be applied to racing motorcycles, as well as to motor vehicles, scooters, Trike™ bikes, three-wheel motorcycles or scooters, such as MP3® made by Piaggio S.p.A., BRP Spyder, such as, for example, Can-Am Spyder and other three-wheel motorcycles, and snowmobiles. According to the application, changes will be made which however do not modify the concept of the present invention.

FIGURES

Further features and advantages of the caliper body will be apparent from the description provided below of preferred embodiments thereof, given for illustrative but not limiting purposes, with reference to the accompanying drawings, in which.

Figure 1:
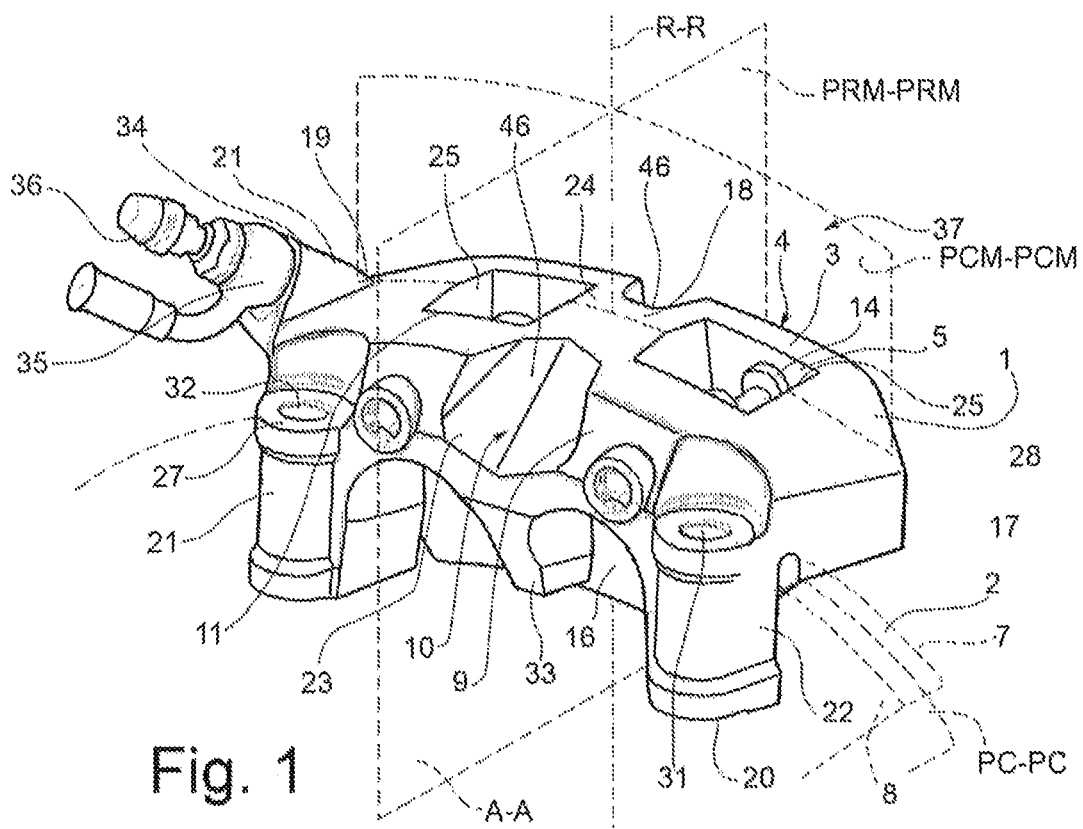
FIG. 1 is an axonometric view of a caliper with radial attachment of the side opposite to the wheel.
Figure 2:
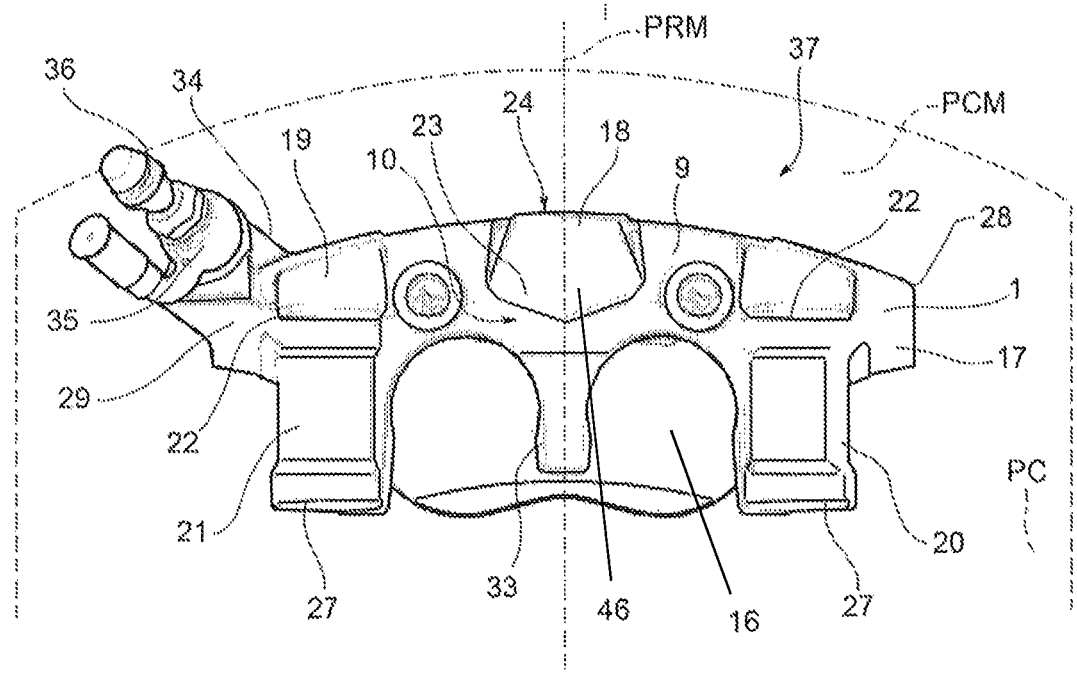
FIG. 2 is a front view of the caliper of FIG. 1 of the side opposite to the wheel.
Figure 3:
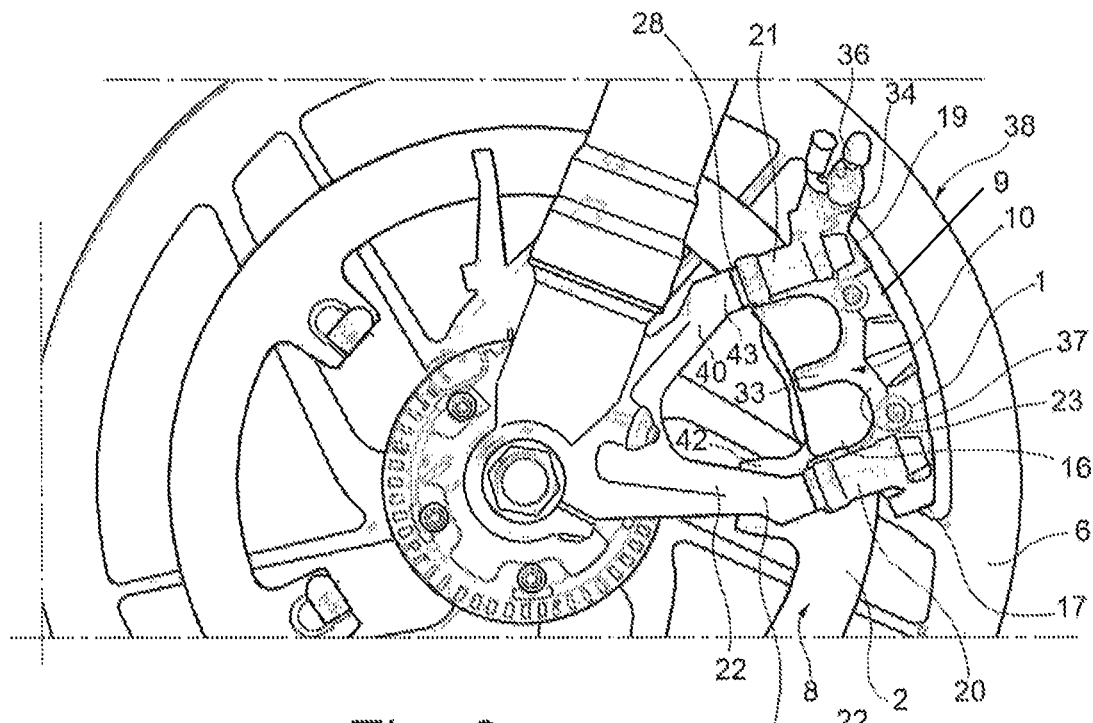
FIG. 3 is a partial front view of the caliper in FIG. 1 mounted straddling a floating disc to form a brake disc, wherein the caliper is connected to a support fixed to a wheel hub of a motorcycle.
Figure 4:
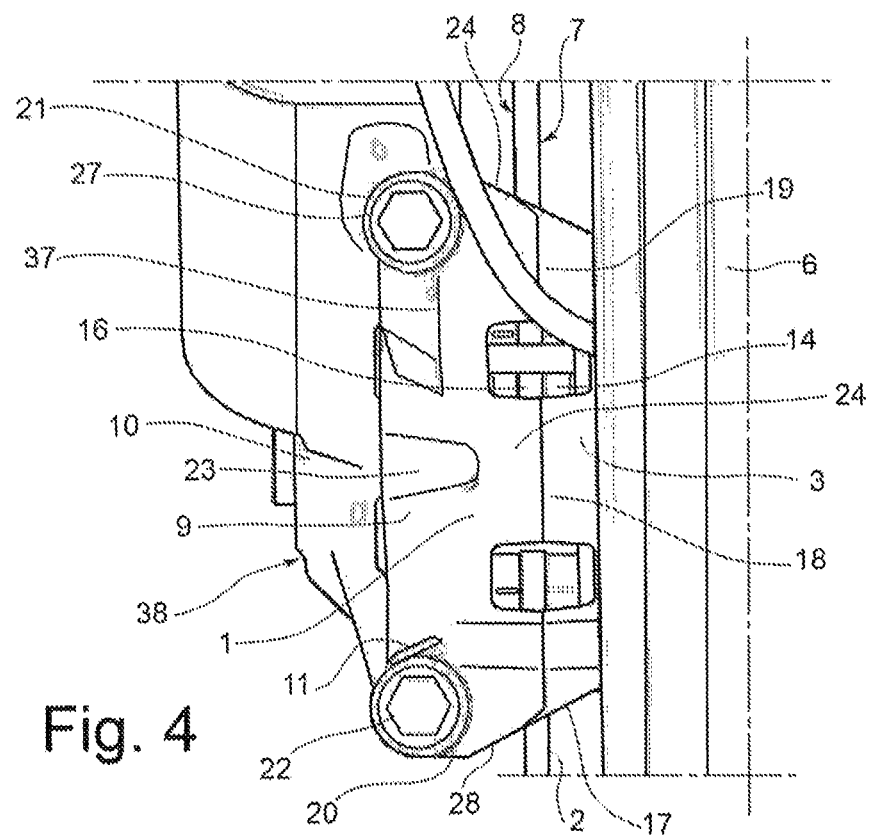
FIG. 4 is a view taken according to the radial direction of a brake mounted on a motor vehicle, according to an embodiment.
Figure 5:
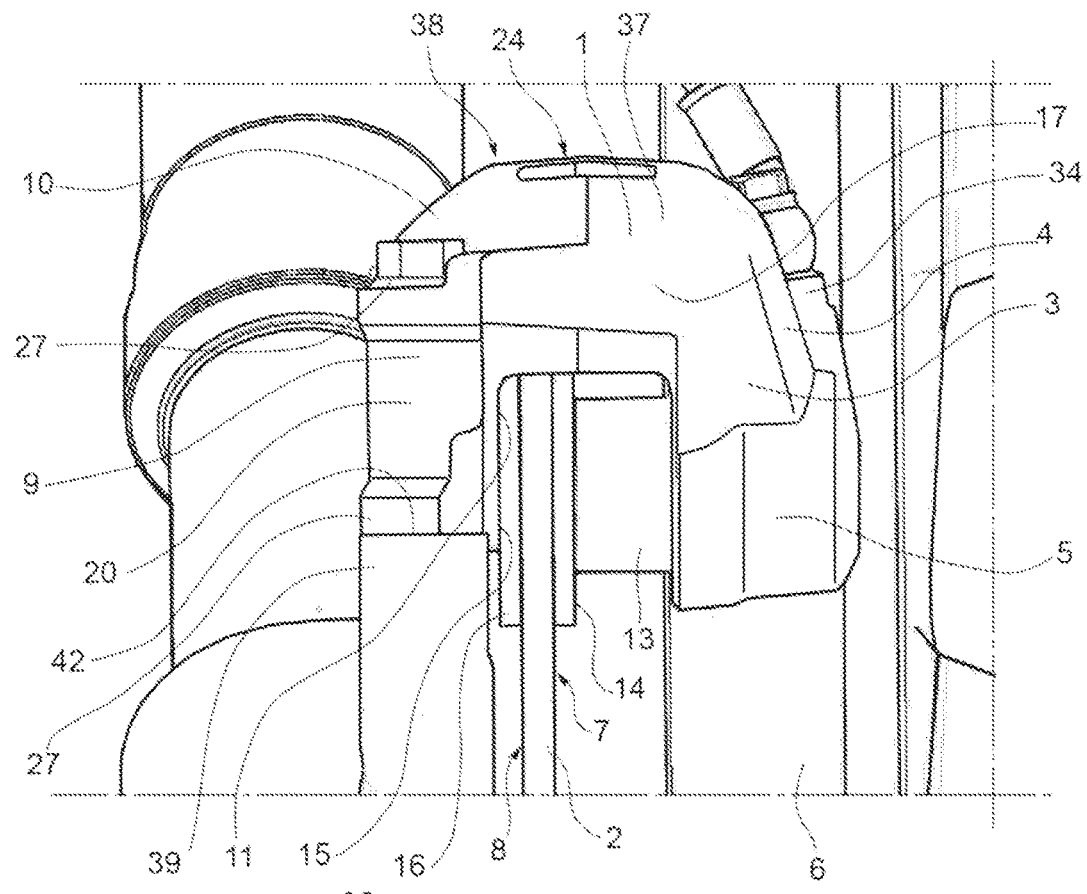
FIG. 5 is a view according to the tangential direction of the brake in FIG. 4, which shows a worn brake pad condition with the thrust devices in extended position.
Figure 6:
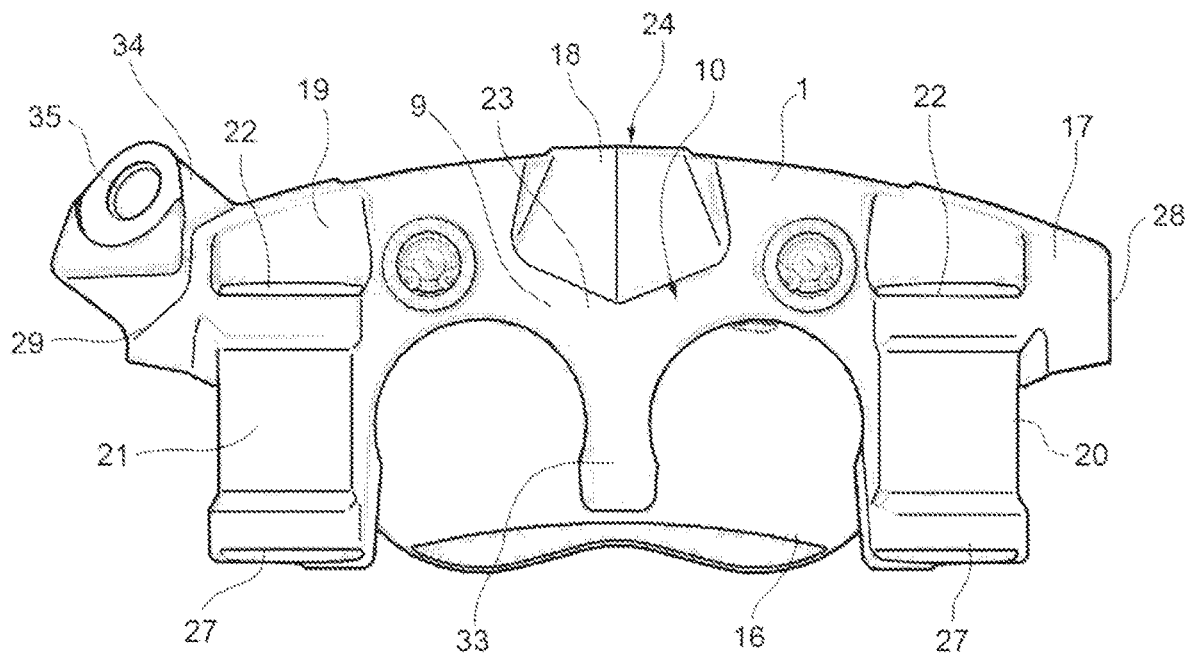
Figure 7:
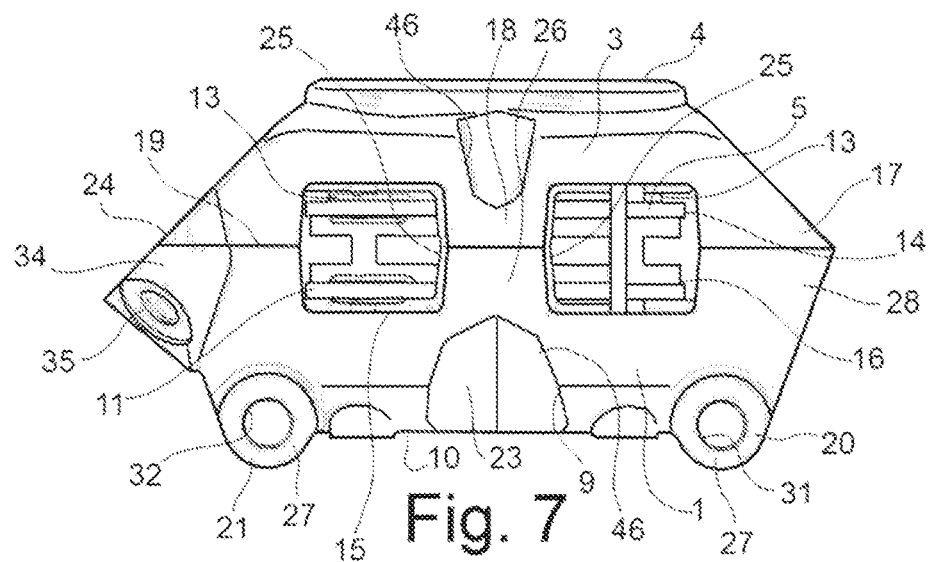
Figure 8:
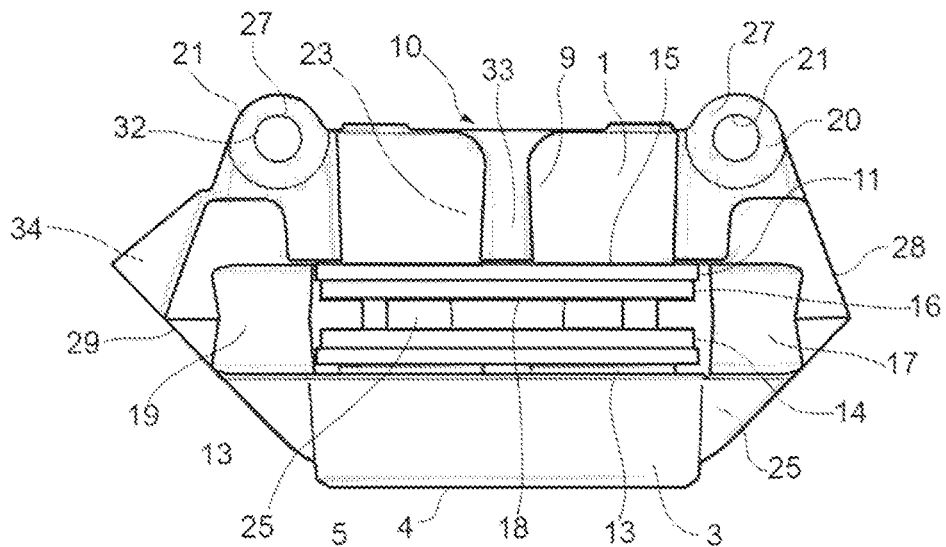
Figure 9:
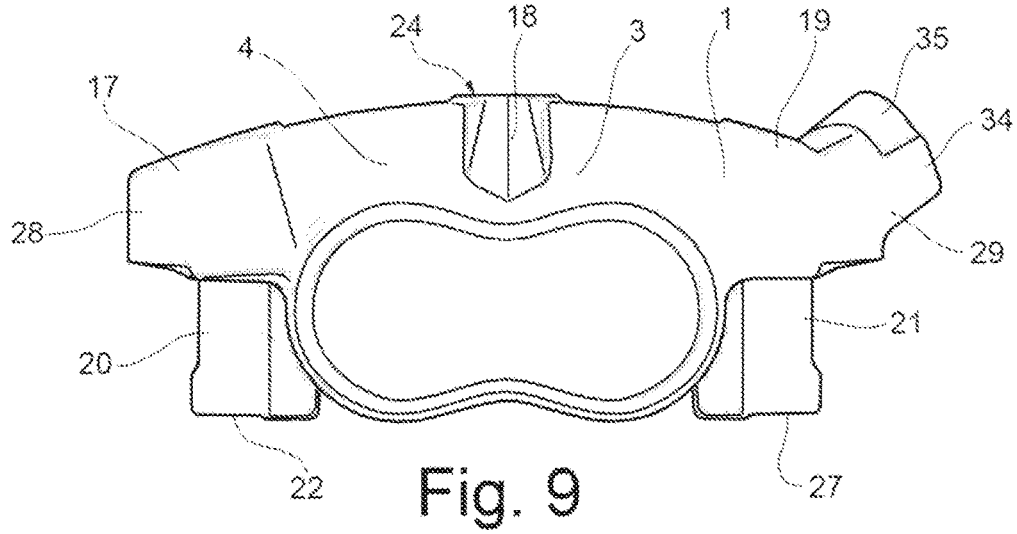
Figure 10:
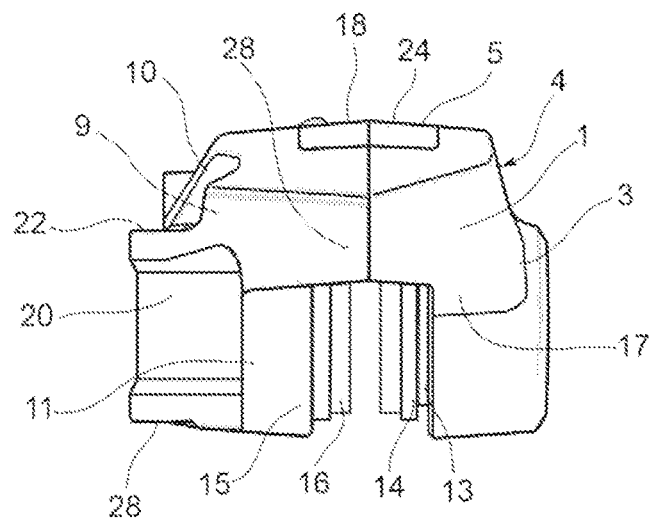
Figure 11:
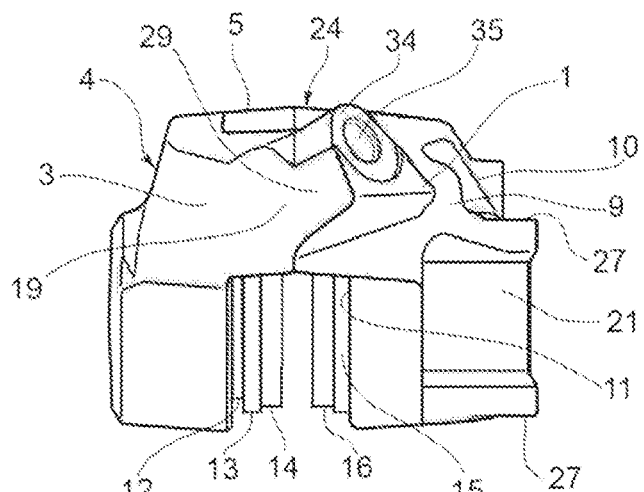
Figure 12:
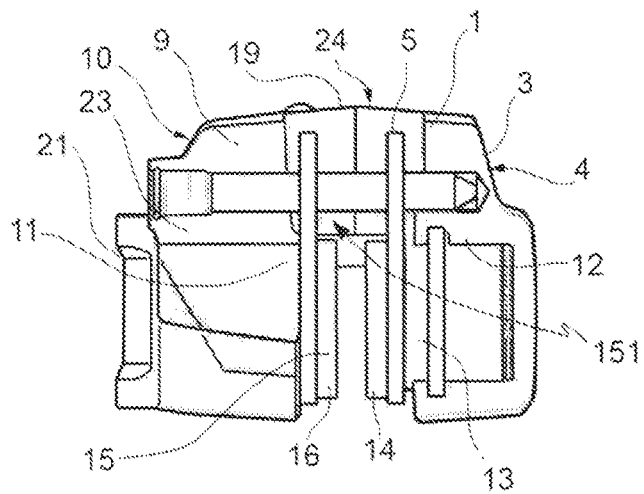
Figure 13:
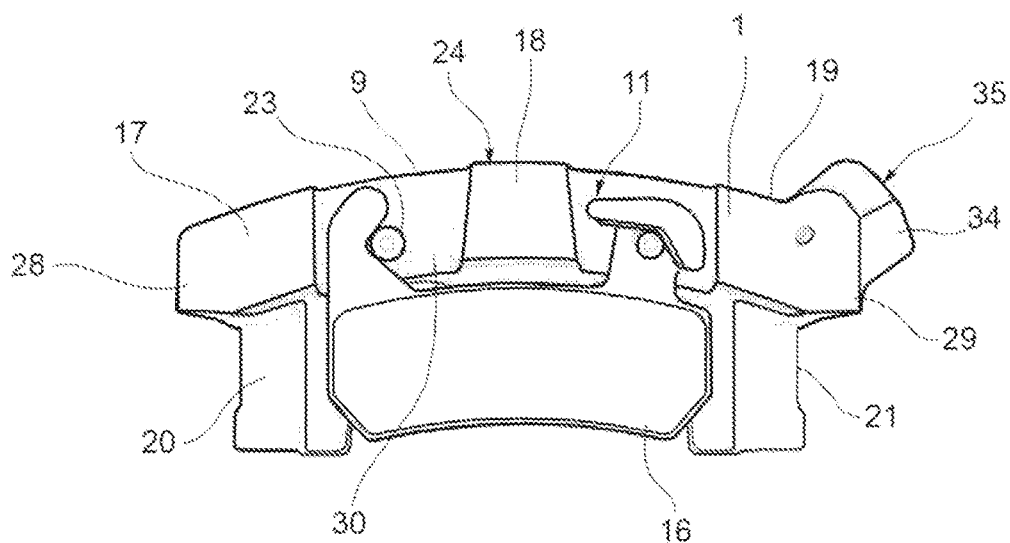
Figure 14:
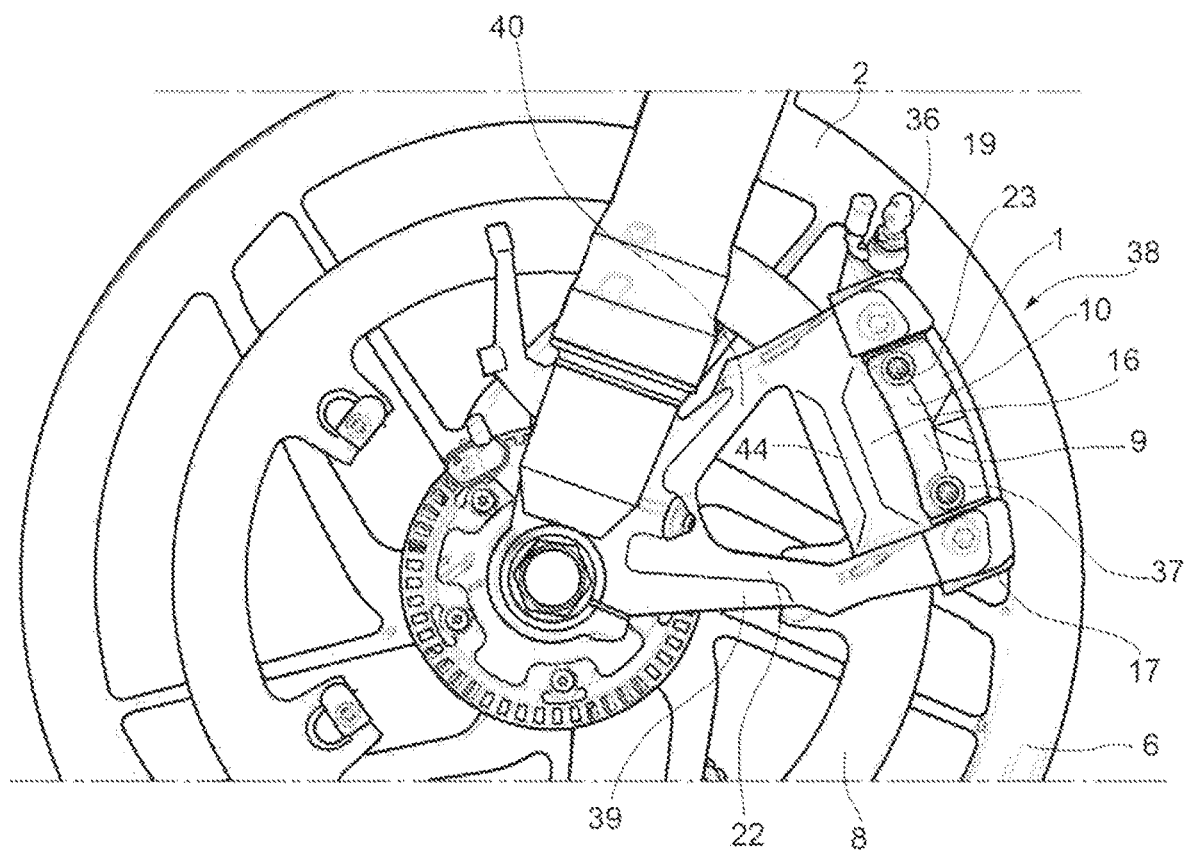
Figure 15:
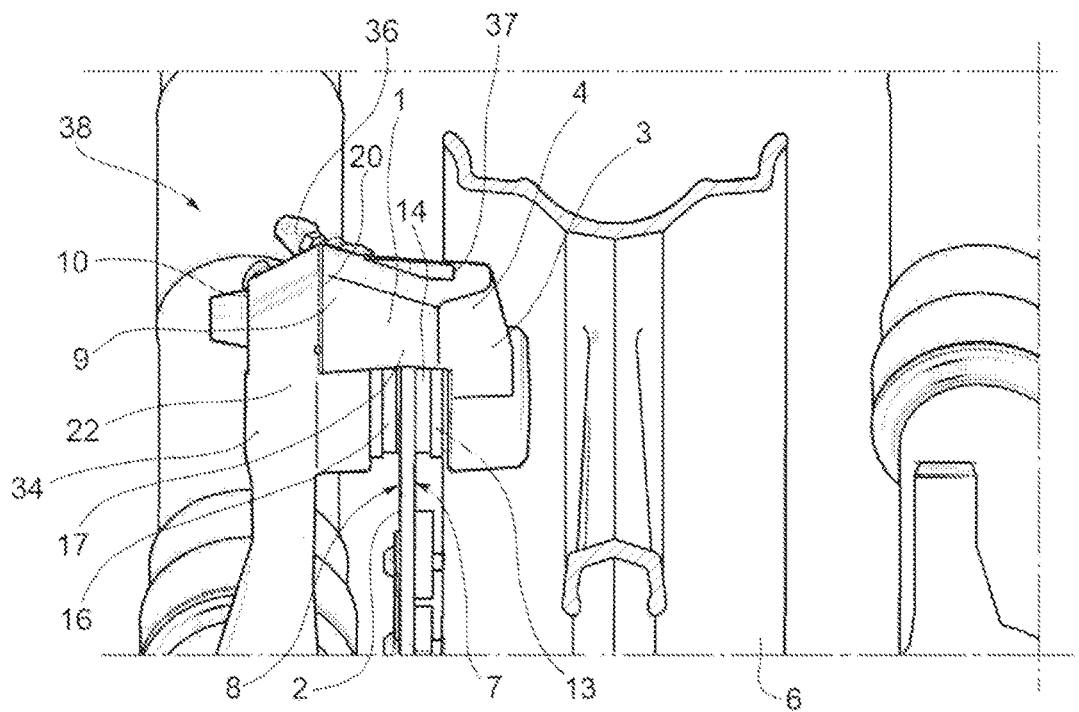
Figure 16:
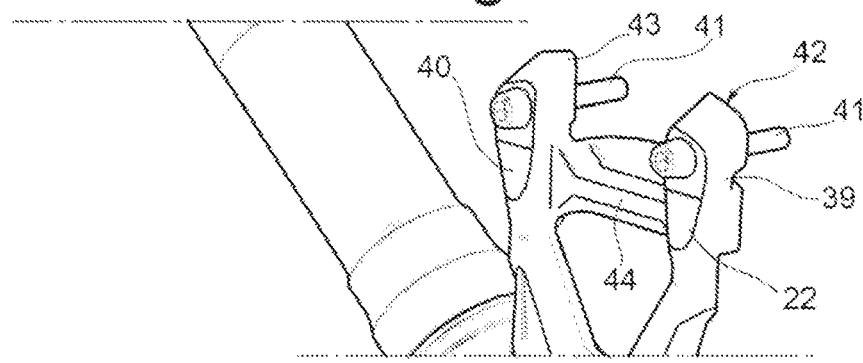
Figure 17:
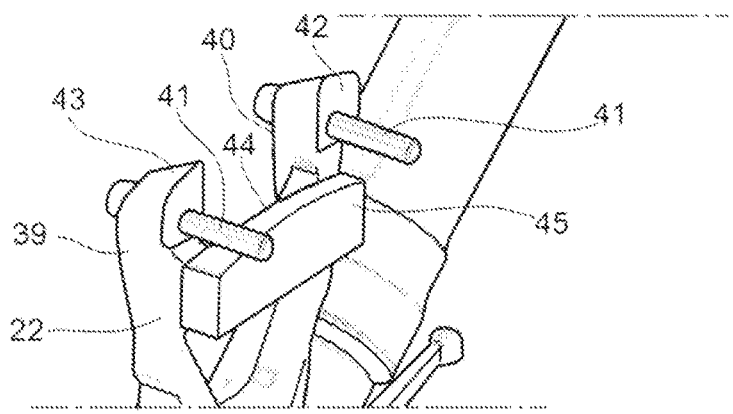
Figure 18:
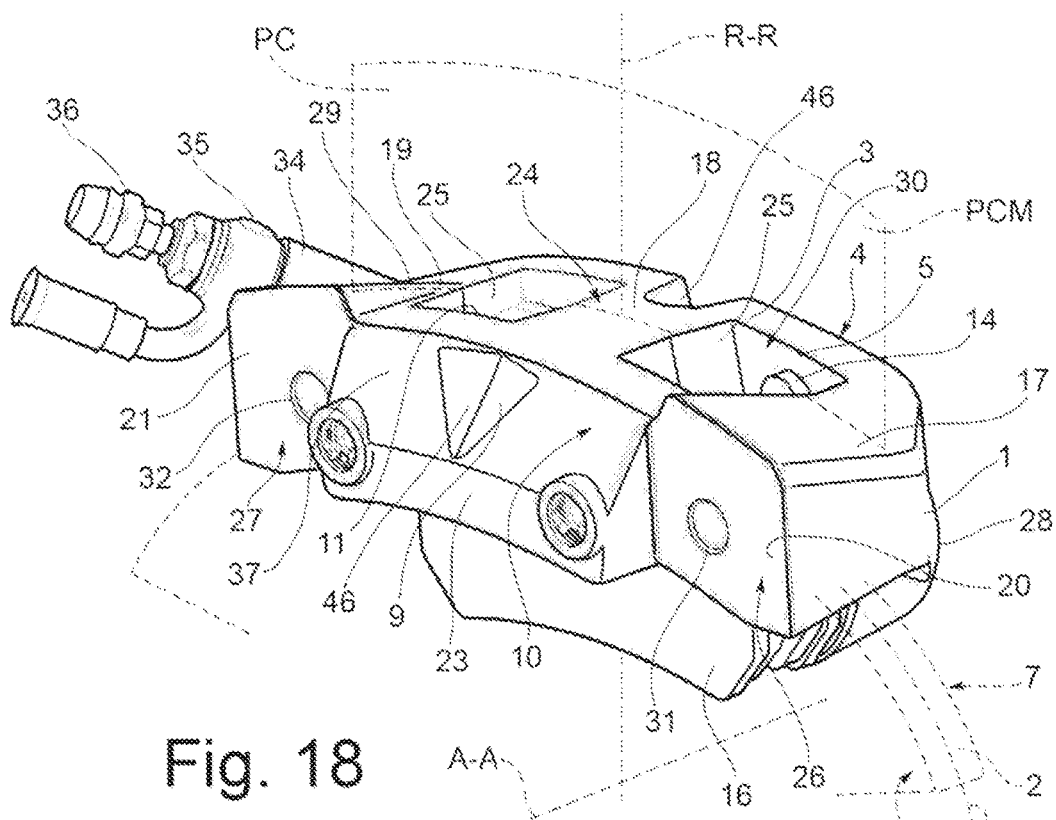
Figure 19:
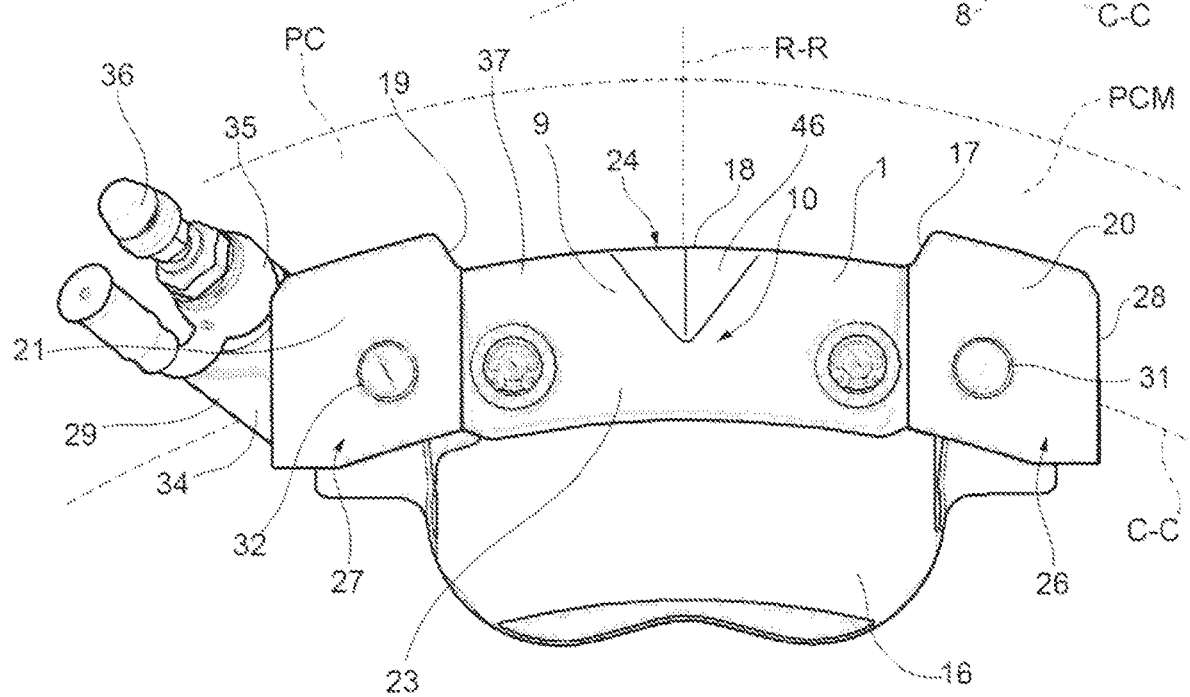
Figure 20:
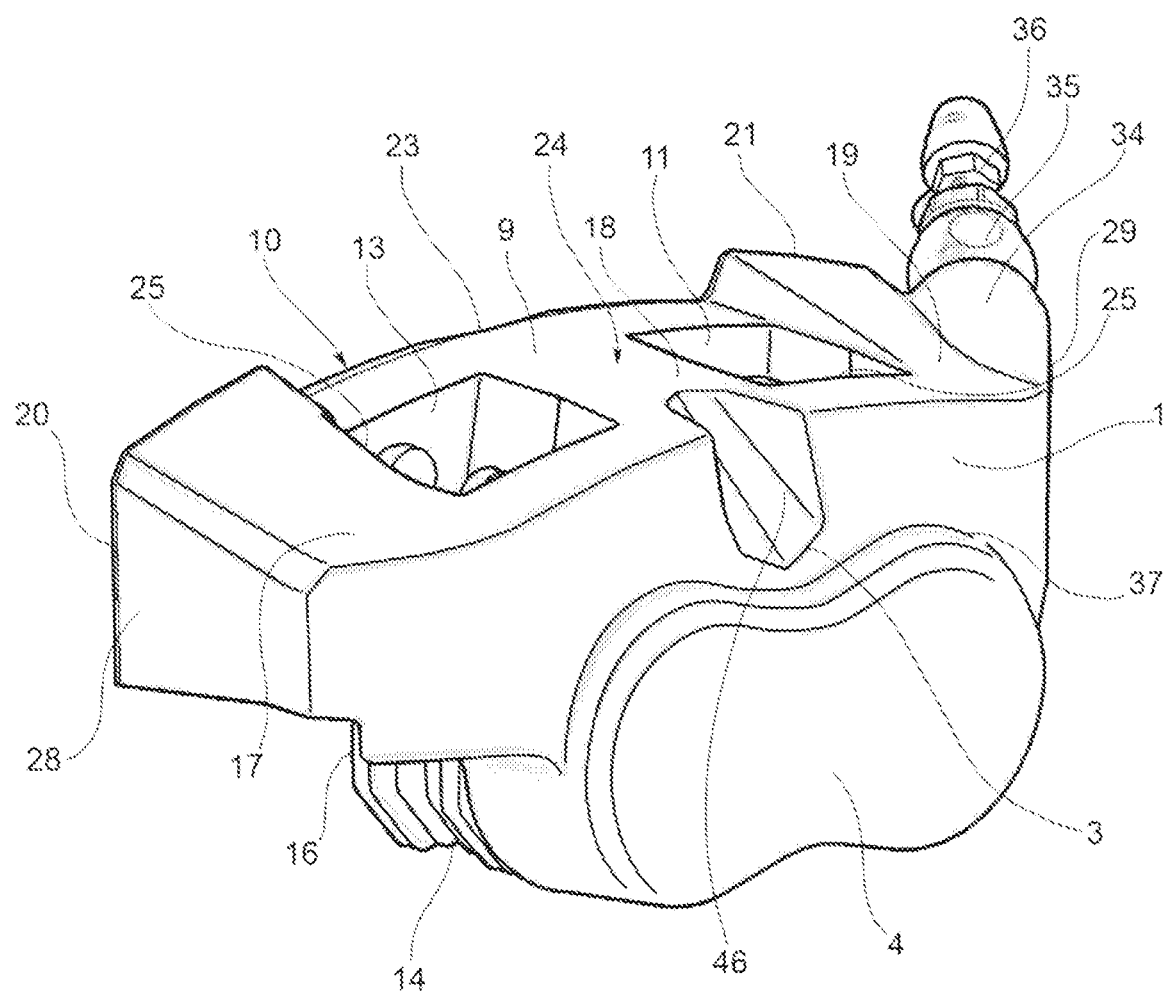
Figure 21:
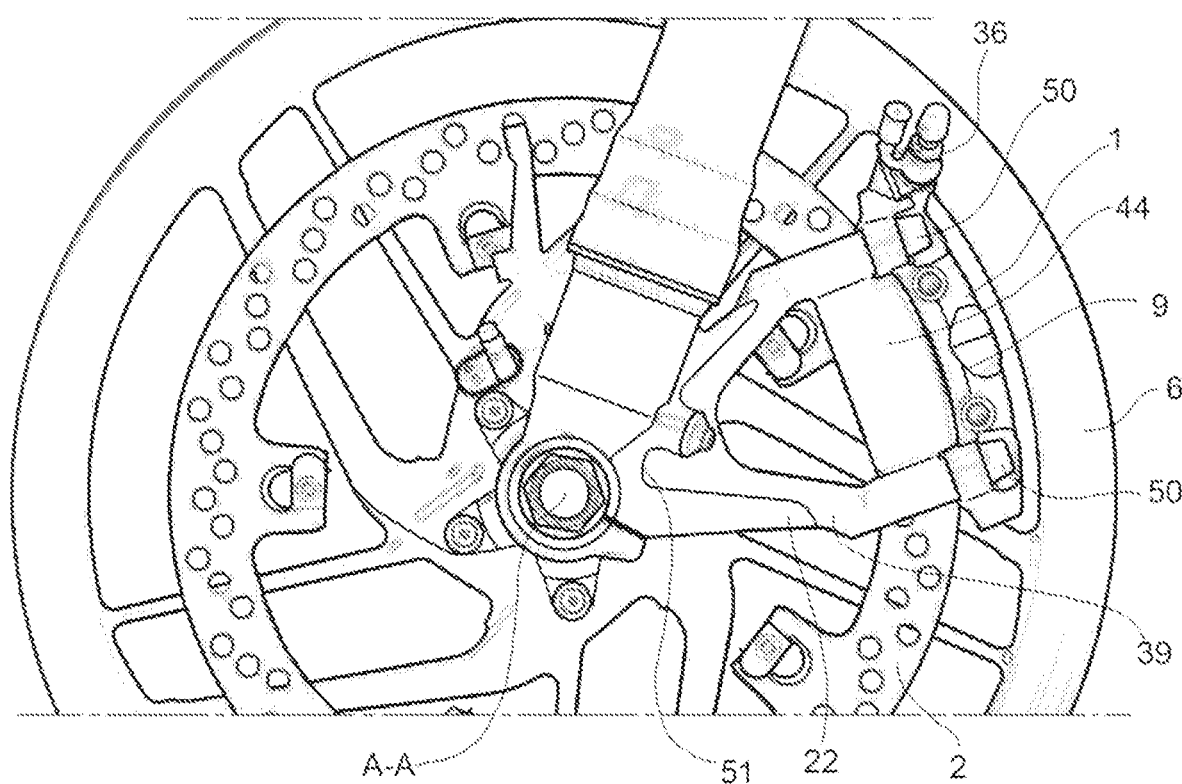
Figure 22:
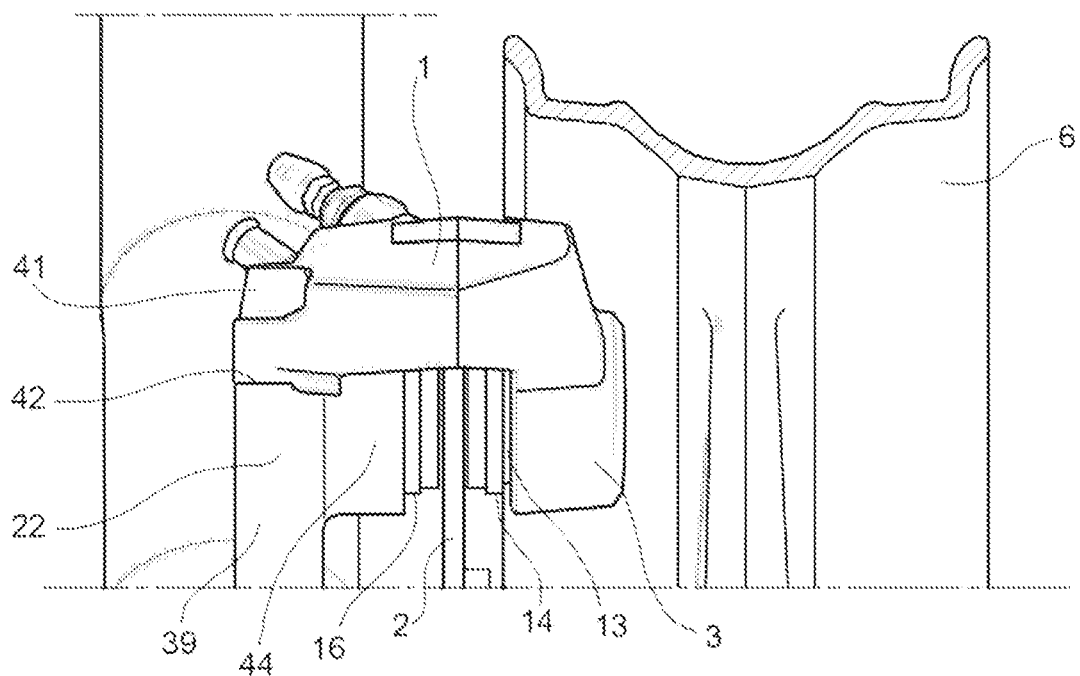
Figure 23:
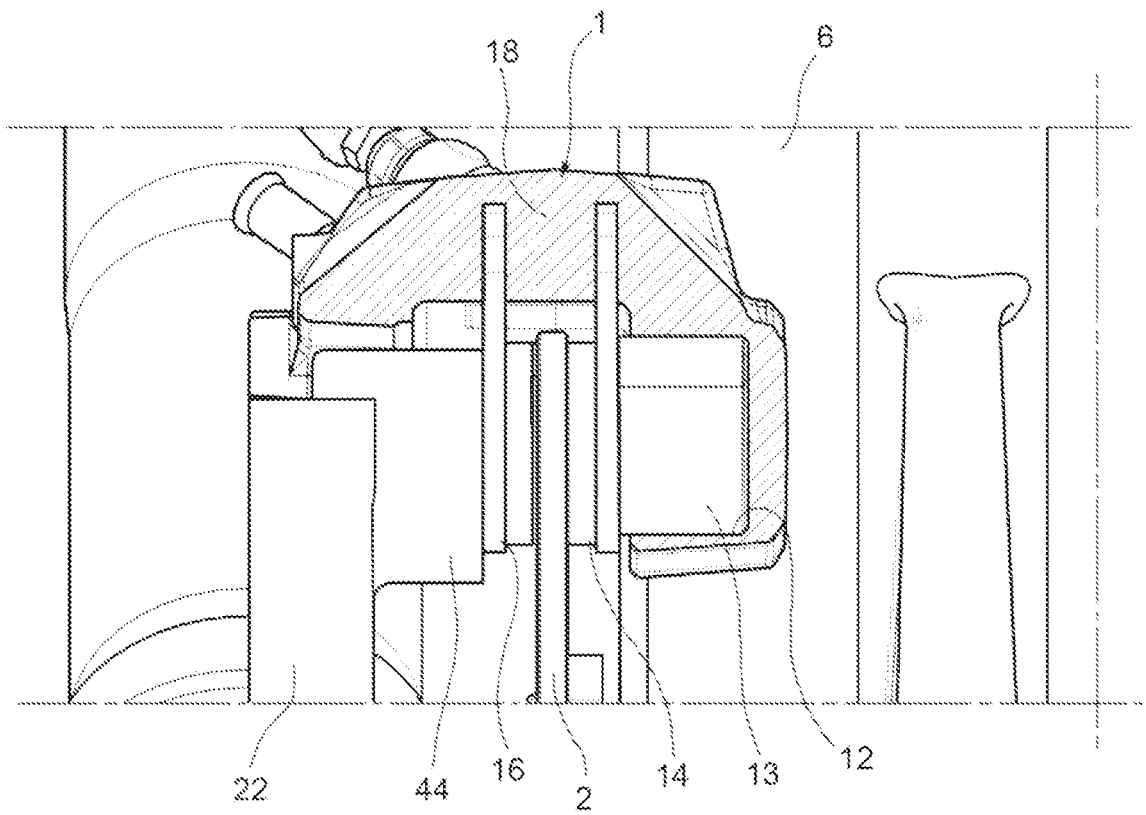
Figure 24:
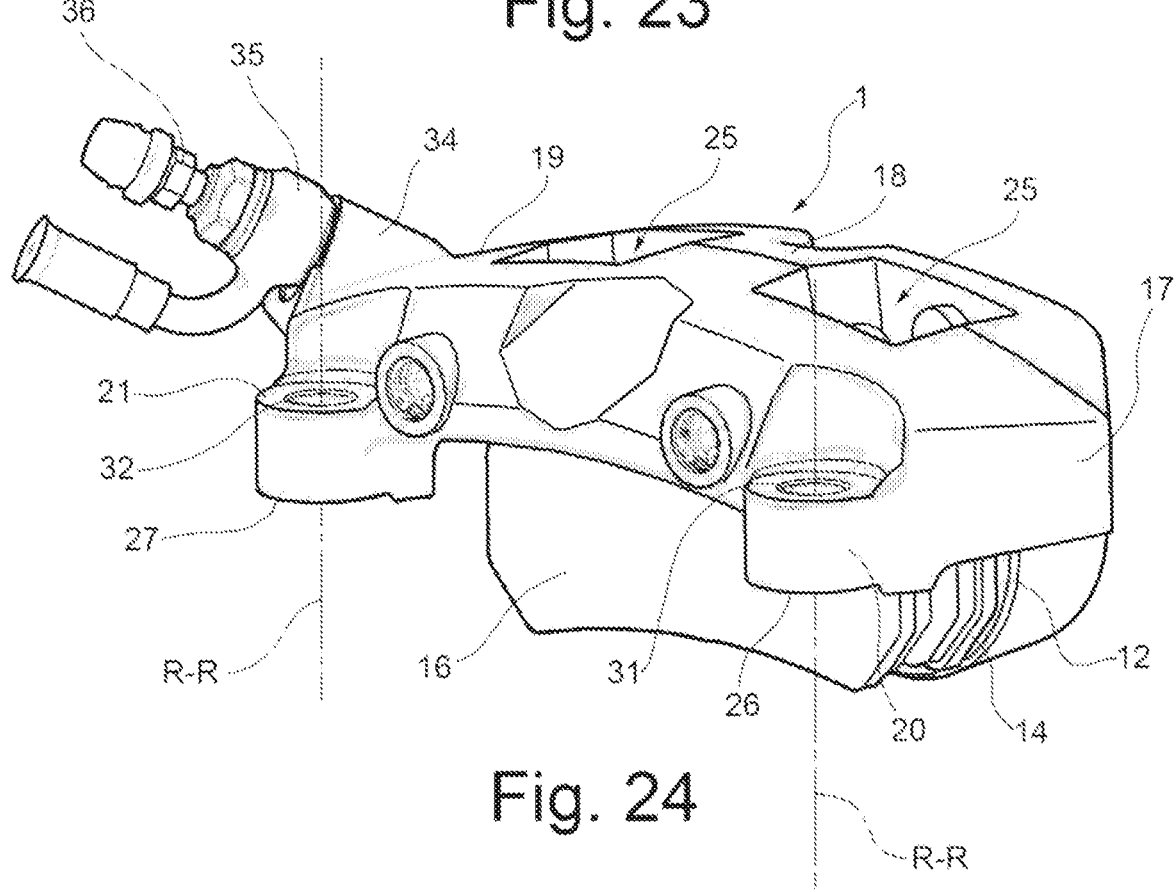
Figure 25:
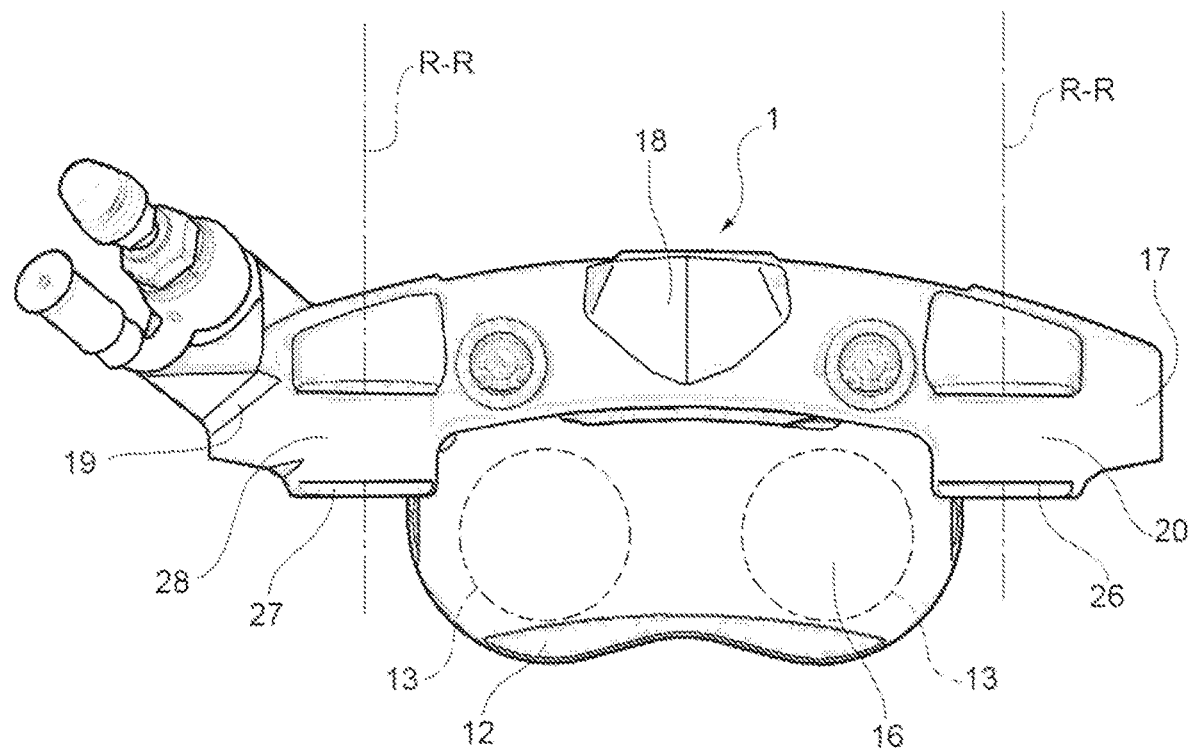
Figure 26:
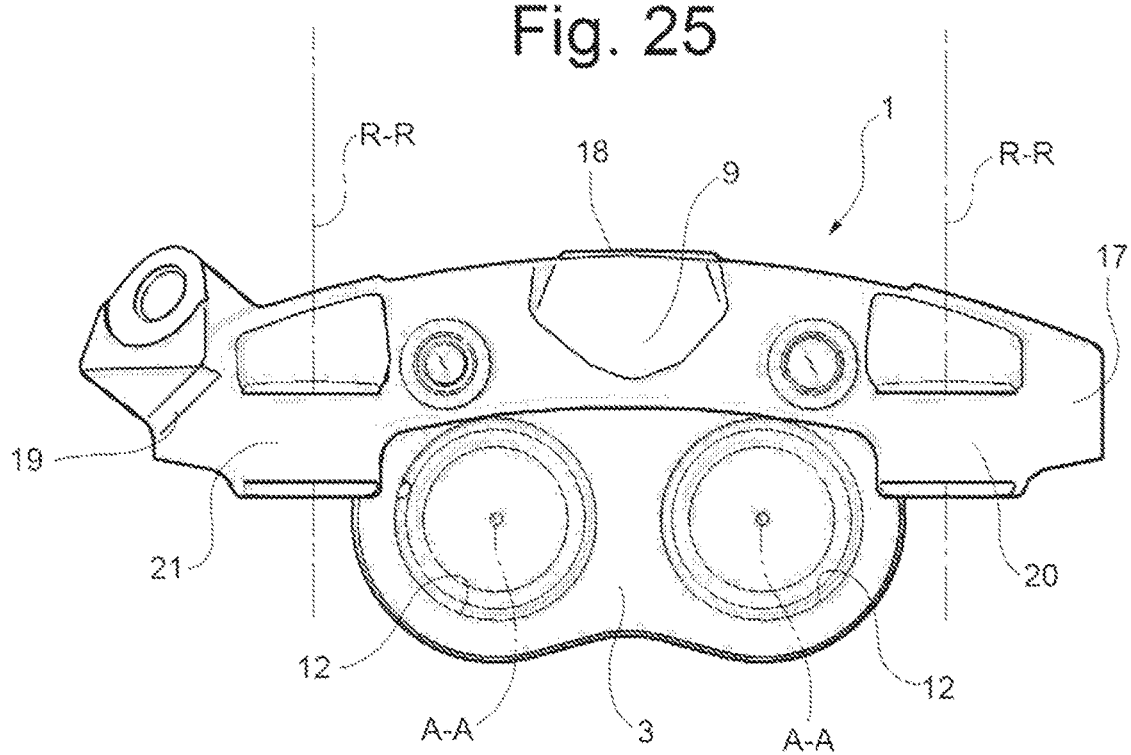
Figure 27:
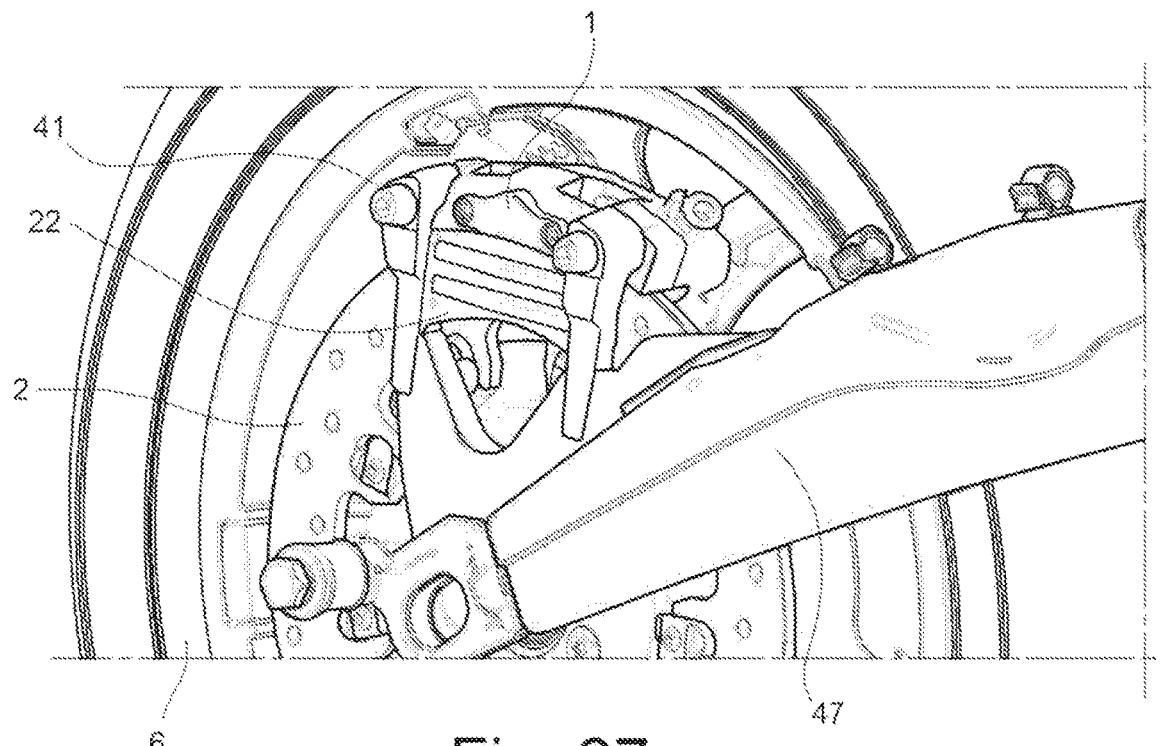
Figure 28:
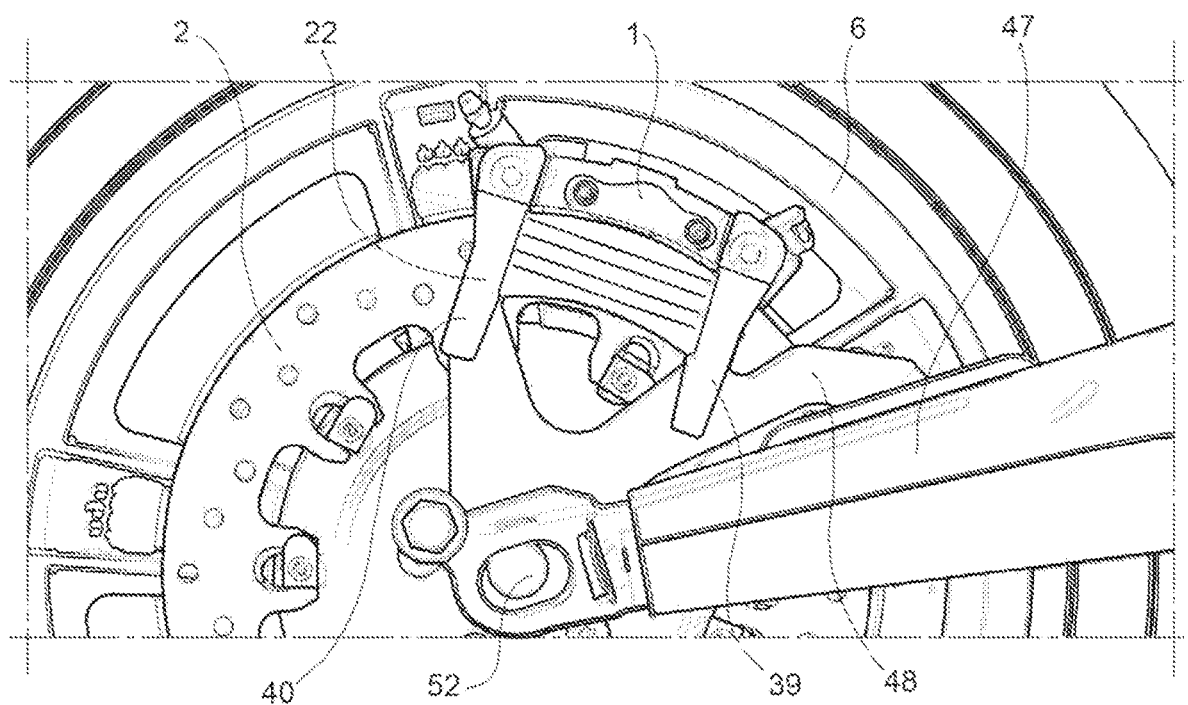
Figure 29:
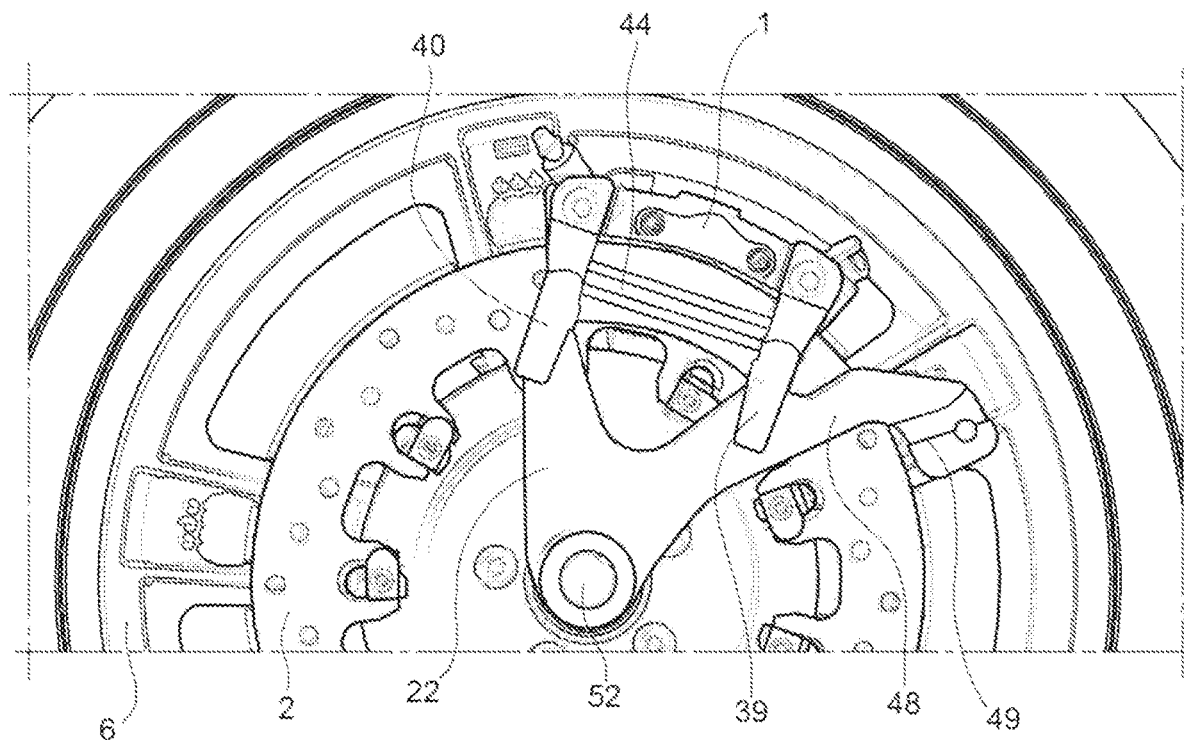
Figure 30:
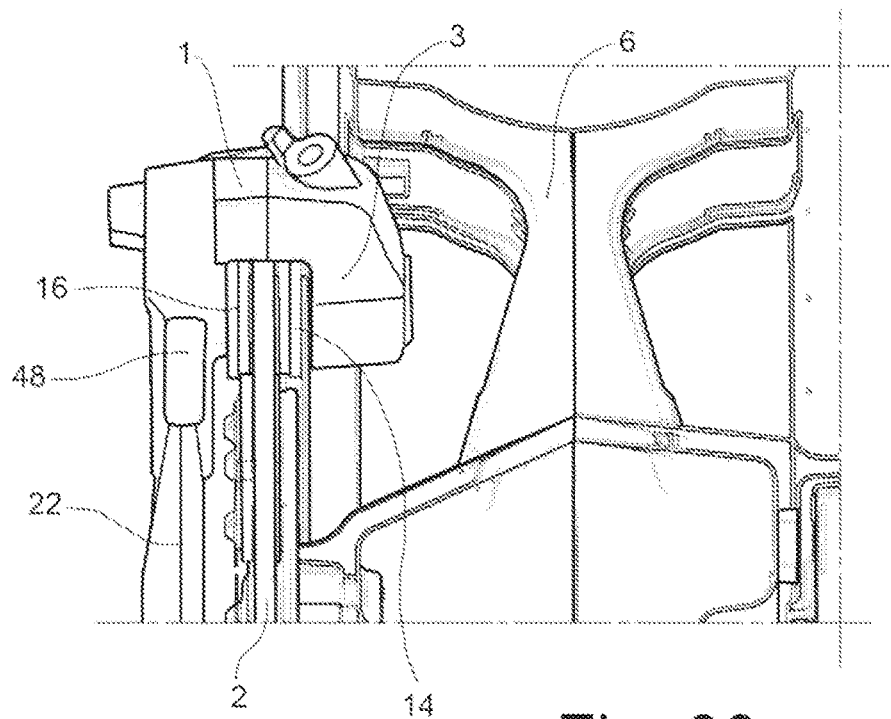
Figure 31:
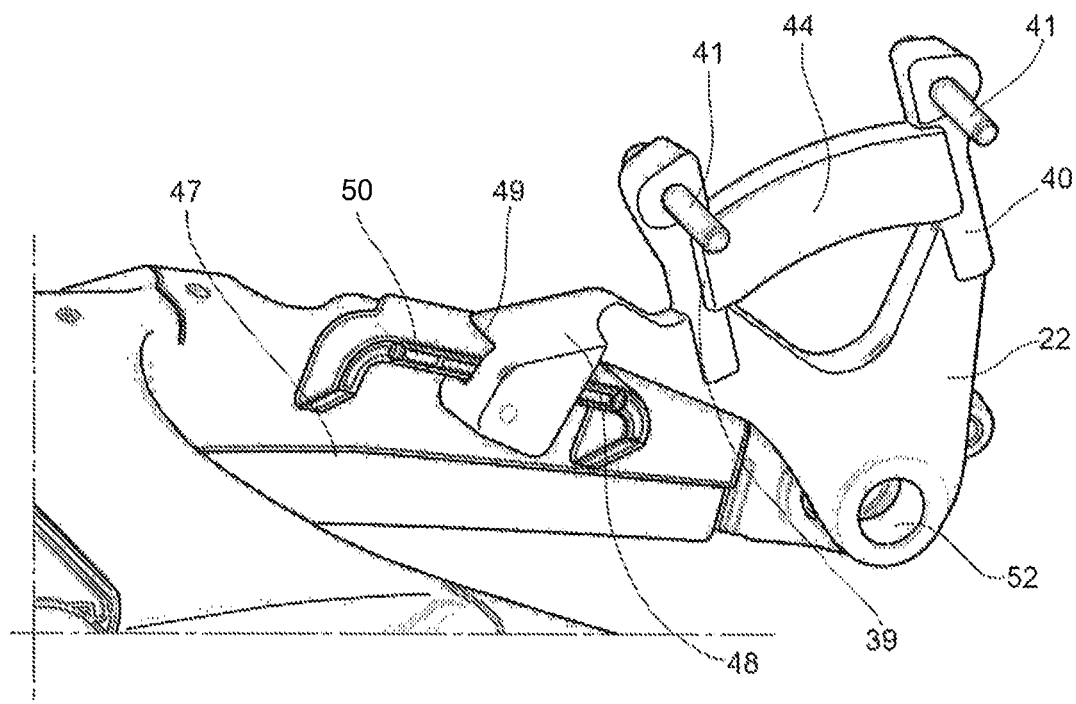
Figure 32:
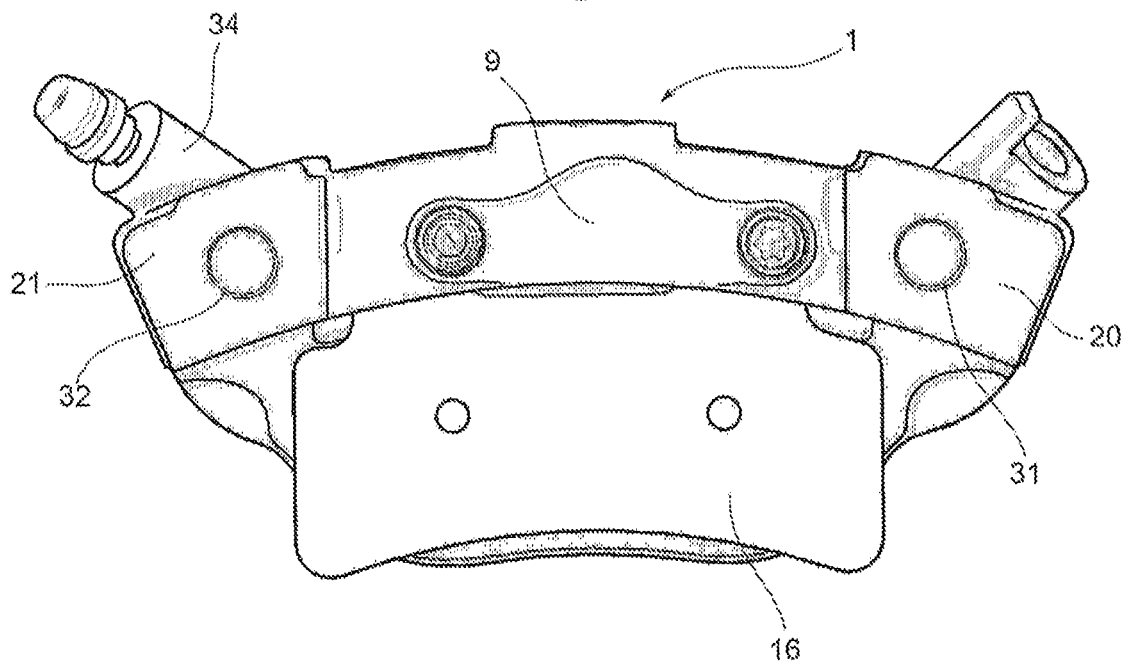

figures from 6 to 11 show the caliper body of the caliper in FIG. 1 according to the orthogonal views;

FIG. 12 shows a section taken along axial planes passing through one of the pad suspension pins and the thrust device axis, here a piston accommodated in a cylinder, of the caliper in FIG. 1;

FIG. 13 shows the caliper body of the caliper in FIG. 1 in section view taken along a median plane of a brake disc associable with the caliper;

FIG. 14 shows a detail of a disc brake mounted on a wheel of a motor vehicle, wherein the caliper is made according to a further embodiment and has an attachment in its support according to an axial direction;

FIG. 15 shows the brake in FIG. 14 according to a tangential direction;

FIG. 16 shows an axonometric view of a detail of a brake caliper support with axial attachment, as shown in FIG. 14;

FIG. 17 shows an axonometric view of a detail of the support in FIG. 16;

figures from 18 to 20 show axonometric and orthogonal views of a caliper with axial attachments according to FIG. 16;

FIG. 21 shows an axonometric view of a detail of a disc brake mounted on a front wheel of a motor vehicle, wherein the caliper is made according to a further embodiment and has an attachment in its support according to a radial direction;

FIG. 22 shows the brake disc mounted on the wheel of the motor vehicle in FIG. 21, taken along a plane passing through the axial direction;

FIG. 23 shows the brake disc mounted on the wheel of the motor vehicle in FIG. 21, taken along a plane passing through the axial direction passing through the caliper body, also sectioned;

FIG. 24 shows an axonometric view of the brake caliper of the brake in FIG. 21 seen from one side opposite to the wheel;

FIG. 25 shows a front view of the caliper in FIG. 24 taken according to an axial direction;

FIG. 26 shows a front view of the caliper body only of the caliper in FIG. 24 taken according to an axial direction;

FIG. 27 shows an axonometric view of a detail of a disc brake mounted on a rear wheel of a motor vehicle, wherein the caliper is made according to a further embodiment and has an attachment to its support according to an axial direction;

FIG. 28 shows a front view of the detail of the disc brake in FIG. 27;

FIG. 29 shows a front view of the detail of the disc brake in FIG. 27, from which the swingarm has been removed;

FIG. 30 shows a detail of disc brake in FIG. 29;

FIG. 31 shows an axonometric view of the support element of the brake caliper in FIG. 27, associated with a support swingarm of the rear wheel of a motor vehicle;

FIG. 32 shows a front view of the disc brake caliper in FIG. 27.

DESCRIPTION OF SOME PREFERRED EMBODIMENTS

According to a general embodiment, a disc brake caliper body 1 is adapted to be arranged straddling a brake disc 2 of floating type.

Said brake disc 2 comprises a first brake disc braking surface 7 and an opposite second brake disc braking surface 8.

Said caliper body 1 comprises a first elongated element wheel side 3. Said first elongated element wheel side 3 comprises a first elongated element caliper outer side 4 and a first elongated element caliper inner side 5. Said first elongated element caliper outer side 4 is adapted to face a wheel of a vehicle 6. At least one portion of the first elongated element caliper inner side 5 is adapted to face, either directly or indirectly, said first brake disc braking surface 7 by means of a first pad 14.

Said caliper body 1 comprises a second elongated element 9 on the side opposed to the wheel. Said second elongated element 9 on the side opposed to the wheel comprises a second elongated element caliper outer side 10 and a second elongated element caliper inner side 5. At least one portion of the second elongated element caliper inner side 11 is adapted to face, either directly or indirectly, said second brake disc braking surface 8 by means of a second opposed pad 16.

The term "second elongated element on the side opposed to the wheel" and "first elongated element wheel side" means "a second element which is suitable to be connected to connecting portions adapted to connect the caliper body to a support element for supporting the caliper", e.g. to a wheel hub, and "a first elongated element as first element opposite to said second element". So, hereinafter either "second elongated element on the side opposed to the wheel" or "elongated element connectible to the support" will be used indifferently and either "first elongated element wheel side" or "elongated element opposite to the support" will be used also indifferently. Indeed, this caliper may be, for example, used on a motor vehicle where the "first elongated element wheel side" is indeed facing the wheel of the motor vehicle, but also in applications such as, for example, snowmobiles, but not necessarily only these, where the "first elongated element wheel side" is an "elongated element opposite to the support" not facing any wheel of the vehicle, but having the same essential features.

Said first elongated element wheel side 3 comprises at least one thrust means seat 12 adapted to receive the thrust means 13 adapted to bias the first pad 14 against said first brake disc braking surface 7.

Said first elongated element wheel side 3 further comprises at least one sliding element 151 adapted to make said first pad 14 slide biased by the thrust means 13 with respect to said caliper body 1.

Said second elongated element 9 on the side opposed to the wheel comprises at least one pad resting surface 15 adapted for the at least partial resting of said second opposed pad 16, preventing this second pad from being biased by any thrust means movable with respect to the caliper body 1 itself.

Said pad resting surface 15 lays on a reference plane or "zero" plane, from which reference for the second opposed pad 16 is made, and thus for the brake disc 2 which, pushed by the action of the thrust means 13, always abuts against said second opposed pad 16, which, in turn, abuts against said pad resting surface 15 of the elongated element 9 on the side opposed to the wheel which is connected to its support and thus relatively little or not at all biased by the elastic deformation of the caliper body, thus independently from the elastic deformation or "strain" of the caliper body, allowing a greater braking accuracy by virtue of better forecasting of the behavior of the caliper during braking, forecasting which allows a more accurate compensation of the deformation and forecasting of the correct position of the brake actuating lever to start the actual braking action of the vehicle.

Said caliper body 1 comprises at least one elongated element connection bridge 17, 18, 19 adapted to connect said first elongated element wheel side 3 to said elongated element 9 on the side opposed to the wheel, so as to be adapted to straddle said brake disc 2.

Advantageously, said second elongated element 9 on the side opposed to the wheel comprises at least two portions, each defining a connecting seat 20, 21 adapted to connect the caliper body 1 to a support element 22 for supporting the caliper to a wheel hub.

Further advantageously, said second elongated element 9 on the side opposed to the wheel comprises at least one connecting portion of second elongated element on the side opposed to the wheel 23, which mutually connects said at least two portions each defining a connecting seat 20, 21.

More advantageously, said connecting portion of second elongated element on the side opposed to the wheel 23 is adapted to face at least one portion of said second pad 16.

According to an alternative embodiment, said connecting portion of second elongated element on the side opposed to the wheel 23 is in one piece with said at least two portions, each defining a connecting seat 20, 21.

According to an alternative embodiment, a first disc inlet end bridge 17 and a second disc outlet end bridge 19 and said at least two portions each defining a connecting seat 20, 21 are provided at said first and second end bridge 17, 19.

According to an alternative embodiment, said first and second end bridge 17, 19 extend so as to straddle the disc brake 2 according to an axial direction A-A substantially parallel to the rotational axis of the brake disc, and said connecting seats 20, 21 are aligned with said end bridges 17, 19 and extend according to an axial direction A-A.

According to an alternative embodiment, said at least two portions each defining a connecting seat 20, 21 form at least two connecting resting planes 26, 27, e.g. planes parallel to a plane which extends according to a radial direction R-R, transversal to the rotational axis of the disc A-A.

According to an alternative embodiment, said connecting seats 20, 21 are aligned with said end bridges 17, 19, and extend according to a direction either radial R-R or parallel to a radial axis or parallel to each other.

According to an alternative embodiment, said at least two portions each defining a connecting seat 20, 21 form at least two connecting resting planes 26, 27, e.g. directed according to a plane which extends according to an axial direction A-A, or passing through an axis parallel to the rotational axis of the disc A-A and orthogonal to a radial axis R-R passing through the middle line of the caliper body 1, or radial middle plane PRM-PRM of the caliper.

According to an alternative embodiment, said end bridges 17, 19 have an end bridge outer side 28, 29 facing in circumferential direction C-C to the outside of the caliper body 1. Said outer side 28, 29 is circumferentially tapered away from the radial middle plane PRM-PRM of the caliper.

According to an alternative embodiment, said at least one central bridge 18 has a central bridge outer side 24 which faces outside the caliper body. Said central bridge outer side 24 is radially tapered away from the caliper body.

According to an alternative embodiment, said central bridge outer side 24 has at least one central bridge groove 46 extending along at least one stretch of said central bridge 18.

According to an alternative embodiment, said at least one central bridge groove 46 is constituted by two central bridge grooves 46 arranged on sloping surfaces of the tapered side of central bridge 24.

According to an alternative embodiment, said central bridge 18 and said end bridges 17, 19 are mutually distanced in circumferential direction C-C forming at least one lightening and heat evacuation window 25, 30.

According to an alternative embodiment, said central bridge 18 and said end bridges 17, 19 are mutually distanced in circumferential direction C-C forming at least two lightening and heat evacuation windows 25, 30.

According to an alternative embodiment, said connecting seats 31, 32 delimited by said portions defining a connecting seat 20, 21 are aligned with said connecting portion of second elongated element on the side opposed to the wheel 23.

According to an alternative embodiment, said connecting portion of second elongated element on the side opposed to the wheel 23 forms a rest for said second opposed pad 16.

According to an alternative embodiment, at least one finger-like portion 33 projects radially from said connecting portion of second elongated element on the side opposed to the wheel 23 as a rest for a second opposed pad portion 16.

According to an alternative embodiment, said caliper body 1 is made in one piece.

According to an alternative embodiment, said caliper body comprises at least two parts which are firmly connected to each other. According to an alternative embodiment, said caliper body comprises at least two parts firmly connected to each other, a first one comprising the first elongated element wheel side 3 and at least one portion of the at least one elongated element connecting bridge 17; 18; 19, a second one comprising the second elongated element 9 on the side opposed to the wheel and at least the remaining portion of the at least one elongated element connection bridge 17; 18; 19.

According to an alternative embodiment, said brake disc 2 on which the caliper body is arranged straddling, comprises a brake disc middle plane, or circumferential plane PC-PC, either parallel to or coinciding with the plane PCM-PCM, as well as transversal to the rotational axis of the brake disc 2 and passing through its middle line. A feeding pipe 34 of the control or brake fluid to the thrust means 13 extends from said thrust means 13 to a pipe inlet 35 arranged in a portion of the caliper body 1 placed in the middle line of the caliper body opposite to the wheel with respect to the circumferential plane PC-PC.

According to an alternative embodiment, said feeding pipe 34 is obtained at least partially in the caliper body 1.

According to an alternative embodiment, said pipe inlet 35 substantially faces the side opposite to the wheel.

According to an alternative embodiment, said pipe inlet 35 is arranged near one of the portions defining a connecting seat 20, 21.

According to an alternative embodiment, a bleeding valve and a control or brake fluid feeding inlet connector 37 are associated with the single pipe inlet 35.

The present invention further relates to a brake caliper 37 comprising at least one caliper body 1 as defined in any one of the embodiments described above.

The present invention further relates to a brake caliper support element 22 adapted to support a brake caliper 37 comprising a caliper body 1 as defined in any one of the embodiments described above, wherein said support element 22 comprises at least two tines 39, 40, each comprising an element 41 for the connection to the caliper body, e.g. studs adapted to be firmly screwed into said connecting seats 31, 32.

According to an alternative embodiment, resting counter-surfaces 42, 43 are provided near each element 41 for the connection to the caliper body, adapted to couple to said connecting seats 31, 32 of the caliper body 1 for a stable and rigid connection between the support element 22 and the caliper body 1.

According to an alternative embodiment, said resting counter-surfaces 42, 43 are arranged on a plane substantially orthogonal to the axial direction A-A.

According to an alternative embodiment, said resting counter-surfaces 42, 43 are arranged on a plane which is substantially orthogonal to a radial direction R-R or a direction parallel to a radial direction R-R passing through the rotational axis of the brake disc 2.

According to an alternative embodiment, a stiffening support element 44 connects the two support element tines 39, 40.

According to an alternative embodiment, the stiffening support element 44 comprises a stiffening element resting surface 45 for resting and supporting said second pad 16.

A disc brake (38) comprising a caliper (37) as defined in claim 12.

The present invention further relates to a disc brake 38 comprising a caliper 37 as defined above and a support element as defined in one of the embodiments defined above.

The present invention further relates to a motor vehicle comprising a disc brake 38 as previously defined.

Hereinafter, a brake caliper supporting element 22 adapted to support a brake caliper 37 comprising a caliper body 1 is described.

Said support element 22 comprises at least two tines 39, 40, each comprising an element 41 for the connection to the caliper body. Resting counter-surfaces 42, 43 are provided near each element 41 for the connection to the caliper body and are adapted to couple to connecting seats 31, 32 of the caliper body 1 for a stable and rigid connection between the support element 22 and the caliper body 1.

Advantageously, a stiffening support element 44 connects the two support element tines 39, 40.

Further advantageously, the stiffening support element 44 comprises a stiffening element resting surface 45 for resting and supporting said second pad 16.

According to an alternative embodiment, the stiffening and support element 44 comprises a stiffening element resting surface 45 for resting and support said second pad 16 which, in operating conditions, abuts directly against said stiffening element resting surface 45.

According to an alternative embodiment, said stiffening and support element 44 structurally integrates with the caliper body 1, although remaining partially separate, to form a second elongated element 9 on the side opposed to the wheel, so as to form a structural completion of the caliper body 1 itself.

According to an advantageous embodiment, not necessarily to be provided together with the embodiments described above, said resting counter-surfaces 42, 43 are arranged on a plane substantially orthogonal to the axial direction A-A.

According to an advantageous embodiment, not necessarily to be provided together with the embodiments described above, said resting counter-surfaces 42, 43 are arranged on a plane which is substantially orthogonal to a radial direction R-R or a direction parallel to a radial direction R-R passing through the rotational axis of the brake disc 2.

According to an advantageous embodiment, not necessarily to be provided together with the embodiments described above, said tines 39, 40 converge away from said connecting elements to the caliper body 41.

According to an advantageous embodiment, not necessarily to be provided together with the embodiments described above, each of said caliper body connecting elements 41 comprises at least one connecting element seat 49 to receive fixing elements 50, such as studs, in order to firmly connect the caliper body 1 to said support element 22.

According to an advantageous embodiment, not necessarily to be provided together with the embodiments described above, said support element 22 is in one piece with the motor vehicle front fork hub 51.

According to an advantageous embodiment, not necessarily to be provided together with the embodiments described above, a wheel axle seat 52 is provided in said support element 22.

According to an advantageous embodiment, not necessarily to be provided together with the embodiments described above, a further support element arm 48 is provided in said support element 22 for anchoring a motorcycle swingarm 47.

According to an advantageous embodiment, not necessarily to be provided together with the embodiments described above, a further arm hooking portion 49 is provided at the free end of said further arm 48 for firmly coupling the support element to the swingarm 47.

A further embodiment of a caliper body will be described below.

Said disc brake caliper body is adapted to be arranged straddling a brake disc 2 of floating type. Said brake disc 2 comprises a first brake disc braking surface 7 and an opposite second brake disc braking surface 8.

Said caliper body comprises a first elongated element wheel side 3, having a first elongated element caliper outer side 4 and a first elongated element caliper inner side 5.

Said first elongated element caliper outer side 4 is adapted to face a wheel of a vehicle 6. At least one portion of the first elongated element caliper inner side 5 is adapted to face, either directly or indirectly by means of a first pad 14, said first brake disc braking surface 7.

Said caliper body comprises a second elongated element 9 on the side opposed to the wheel having a second elongated element caliper outer side 10 and a second elongated element caliper inner side 5.

At least one portion of the second elongated element caliper inner side 11 is adapted to face, either directly or indirectly by means of a second opposed pad 16, said second brake disc braking surface 8.

Said first elongated element wheel side 3 comprises at least one thrust means seat 12 adapted to receive the thrust means 13 adapted to bias the first pad 14 against said first brake disc braking surface 7.

Said second elongated element 9 on the side opposed to the wheel comprises at least one pad resting surface 15 adapted for the at least partial resting of said second opposed pad 16, preventing this second pad from being biased by any thrust means movable with respect to the caliper body 1 itself.

Said caliper body 1 comprises at least one elongated element connection bridge 17, 18, 19 adapted to connect said first elongated element wheel side 3 to said second elongated element 9 on the side opposed to the wheel, so as to be adapted to straddle said brake disc 2.

According to an advantageous embodiment, not necessarily to be provided together with the embodiments described above, at least said second elongated element 9 on the side opposed to the wheel comprises at least two portions, each defining a connecting seat 20, 21 adapted to connect the caliper body 1 to a support element 22 for supporting the caliper to the vehicle.

According to an advantageous embodiment, not necessarily to be provided together with the embodiments described above, said at least one thrust means seat 12 faces freely in axial direction A-A so that said at least one thrust means seat 12 is entirely accessible along rectilinear directions parallel to the axial direction A-A, avoiding to interfere with said caliper body 1.

According to an advantageous embodiment, not necessarily to be provided together with the embodiments described above, said second elongated element 9 on the side opposed to the wheel comprises at least one connecting portion of second elongated element on the side opposed to the wheel 23 which mutually connects said at least two portions each defining a connecting seat 20, 21.

According to an advantageous embodiment, not necessarily to be provided together with the embodiments described above, said connecting portion of second elongated element on the side opposed to the wheel 23 is adapted to face at least one portion of said second pad 16.

According to an alternative embodiment, not necessarily to be provided together with the embodiments described above, said connecting portion of second elongated element on the side opposed to the wheel 23 is in one piece with said at least two portions, each defining a connecting seat 20, 21.

According to an advantageous embodiment, not necessarily to be provided together with the embodiments described above, said connecting seat 20, 21 is adapted to connect the caliper body 1 to a support element 22 to support the caliper to a wheel hub or wheel pin or swingarm 47.

According to an advantageous embodiment, not necessarily to be provided together with the embodiments described above, a first disc inlet end bridge 17 and a second disc outlet end bridge are provided, and wherein said at least two portions each defining a connecting seat 20, 21 are provided at said first and second end bridge 17, 19.

According to an advantageous embodiment, not necessarily to be provided together with the embodiments described above, said first and second end bridge 17, 19 extend so as to straddle the brake disc 2 according to an axial direction A-A substantially parallel to the rotational axis of the brake disc.

According to an advantageous embodiment, not necessarily to be provided together with the embodiments described above, said connecting seats 20, 21 are aligned with said end bridges 17, 19, and extend according to an axial direction A-A.

According to an advantageous embodiment, not necessarily to be provided together with the embodiments described above, said at least two portions each defining a connecting seat 20, 21 form at least two connecting resting planes 26, 27, e.g. directed according to a plane which extends according to a radial direction R-R, transversal to the rotational axis of the disc A-A.

According to an advantageous embodiment, not necessarily to be provided together with the embodiments described above, said connecting seats 20, 21 are aligned with said end bridges 17, 19, and extend according to a direction either radial R-R or parallel to a radial axis or parallel to each other.

According to an advantageous embodiment, not necessarily to be provided together with the embodiments described above, said at least two portions each defining a connecting seat 20, 21 form at least two connecting resting planes 26, 27, e.g. directed according to a plane which extends according to an axial direction A-A, or passing through an axis parallel to the rotational axis of the disc A-A and orthogonal to a radial axis passing through the middle line of the caliper body 1, or radial middle plane PRM-PRM of the caliper.

According to an advantageous embodiment, not necessarily to be provided together with the embodiments described above, said end bridges 17, 19 have an end bridge outer side 28, 29 facing in circumferential direction C-C outside the caliper body 1, and wherein said outer side 28, 29 is circumferentially tapered away from the radial middle plane PRM-PRM of the caliper.

According to an advantageous embodiment, not necessarily to be provided together with the embodiments described above, said at least one central bridge 18 has a central bridge outer side 24, which externally faces the caliper body, and wherein said central bridge outer side 24 radially tapers moving radially away from the caliper body.

According to an advantageous embodiment, not necessarily to be provided together with the embodiments described above, said central bridge outer side 24 has at least one central bridge groove 46 extending along a stretch of said central bridge 18.

According to an advantageous embodiment, not necessarily to be provided together with the embodiments described above, said at least one central bridge groove 46 are two central bridge grooves arranged on sloping surfaces of the tapered side of central bridge 24.

According to an advantageous embodiment, not necessarily to be provided together with the embodiments described above, said central bridge 18 and said end bridges 17, 19 are mutually distanced in circumferential direction C-C forming at least two lightening and heat evacuation windows 25, 30.

According to an alternative embodiment, not necessarily to be provided together with the embodiments described above, said connecting seats 31, 32 delimited by said portions defining a connecting seat 20, 21 are aligned with said connecting portion of second elongated element on the side opposed to the wheel 23.

According to an advantageous embodiment, not necessarily to be provided together with the embodiments described above, said connecting portion of second elongated element on the side opposed to the wheel 23 forms a rest for said second opposed pad 16.

According to an advantageous embodiment, not necessarily to be provided together with the embodiments described above, said caliper body 1 is in one piece.

According to an advantageous embodiment, not necessarily to be provided together with the embodiments described above, said caliper body comprises at least two parts which are firmly connected to each other.

According to an advantageous embodiment, not necessarily to be provided together with the embodiments described above, said caliper body comprises at least two parts firmly connected to each other, a first one comprising the first elongated element wheel side 3 and at least one portion of the at least one elongated element connection bridge 17; 18; 19, a second one comprising the second elongated element 9 on the side opposed to the wheel and at least the remaining portion of the at least one elongated element connection bridge 17; 18; 19.

According to an advantageous embodiment, not necessarily to be provided together with the embodiments described above, said first elongated element wheel side 3 comprises at least one sliding element (151) adapted to make said first pad 14 slide biased by the thrust means 13 with respect to said caliper body 1.

According to an advantageous embodiment, not necessarily to be provided together with the embodiments described above, said brake disc 2 on which the caliper body is arranged straddling, comprises a brake disc middle plane, or circumferential plane PC-PC, transversal to the rotational axis of the brake disc 2 and passing through its middle line. A feeding pipe 34 of the control or brake fluid to the thrust means 13 extends from said thrust means 13 to a pipe inlet 35 arranged in a portion of the caliper body 1 placed in the middle line of the caliper body opposite to the wheel with respect to the circumferential plane PC-PC.

According to an advantageous embodiment, not necessarily to be provided together with the embodiments described above, said feeding pipe 34 is obtained at least partially in the caliper body 1.

According to an advantageous embodiment, not necessarily to be provided together with the embodiments described above, said pipe inlet 35 substantially faces the side opposite to the wheel 6.

According to an advantageous embodiment, not necessarily to be provided together with the embodiments described above, said pipe inlet 35 is arranged near one of the portions defining a connecting seat 20, 21.

According to an advantageous embodiment, not necessarily to be provided together with the embodiments described above, a bleeding valve 36 and a control or brake fluid inlet connector 37 are associated with the single pipe inlet 35.

The present invention also relates to a brake caliper 37 which comprises at least one caliper body 1 as defined in any one of the embodiments described above.

The present invention also relates to a brake caliper support element 22 adapted to support a brake caliper 37 which comprises a caliper body 1 as defined in any one of the embodiments described above, wherein said support element 22 comprises at least two tines 39, 40, each comprising an element 41 for the connection to the caliper body, e.g. studs.

The present invention also relates to a disc brake 38 comprising a caliper 37 according to any one of the embodiments described above, and a disc brake 38 comprising a caliper 37 according to any one of the embodiments described above and a support element according to any one of the embodiments described above.

The present invention further relates to a motor vehicle comprising a disc brake 38 according to any one of the embodiments described above.

By virtue of the illustrated embodiments, a reduction of the manufacturing costs can be obtained in addition to the advantages listed above because, unlike a monoblock disc or a disc made in one piece, the caliper body suggested here has a piston zone, in particular the cylinders, which can be easily accessed by tools for a more accurate working. In this manner, the use of special equipment which must work in undercut position is avoided, thus also reducing the working cycle time.

Furthermore, it is possible to improve performance because the working temperature of the caliper is reduced with respect to the working temperatures of the known calipers. This reduction of the working temperature can be obtained by increasing the heat exchange surface (the heat is also distributed on the entire area of the support element or foot) promoting the heat exchange directly between pad and support and avoiding a high heat transmission to the caliper body itself.

A person skilled in art may make many changes, adaptations and replacements to the embodiments described above or may replace elements with others which are functionally equivalent in order to satisfy contingent needs without however departing from the scope of protection of the appended claims.

LIST OF REFERENCES

1 disc brake caliper body
2 brake disc
3 first elongated element wheel side
4 first elongated element caliper outer side
5 first elongated element caliper inner side
6 wheel of a vehicle
7 first brake disc braking surface
8 second brake disc braking surface
9 second elongated element on the side opposed to the wheel
10 second elongated element caliper outer side
11 second elongated element caliper inner side
12 thrust means seat
13 thrust means
14 first pad
15 pad resting surface
16 second opposed pad
17 elongated element connecting bridge disc inlet side in forward vehicle travel
18 central elongated element connecting bridge
19 elongated element connecting bridge disc outlet side in forward vehicle travel
20 portion defining a connecting seat
21 portion defining a connecting seat
22 support element
23 connecting portion of second elongated element on the side opposed to the wheel
24 central bridge outer side
25 lightening and heat evacuation window
26 connection resting plane
27 connection resting plane
28 end bridge outer side
29 end bridge outer side
30 lightening and heat evacuation window
31 connecting seat
32 connecting seat 33 finger-like portion
34 pipe
35 pipe inlet
36 bleeding valve
37 brake caliper
38 disc brake
39 support element tine
40 support element tine
41 element for the connection to the caliper body
42 resting counter-surfaces
43 resting counter-surfaces
44 stiffening support element
45 stiffening element resting surface
46 central bridge groove
47 motorcycle swingarm
48 further support element arm
49 connecting element seat
50 fixing elements
51 motor vehicle front fork hub
52 wheel axle seat
151 sliding element
A-A axial direction
R-R radial direction
C-C circumferential direction
PRM-PRM radial middle plane of the caliper
PRM-PRM circumferential middle plane of the caliper
PC-PC circumferential middle plane of the brake disc

The invention claimed is:

1. A brake caliper support element suitable for supporting a brake caliper comprising a caliper body, wherein said support element comprises at least two tines each comprising an element for the connection to the caliper body, wherein resting counter-surfaces are provided in the proximity of each element for the connection to the caliper body, suitable for coupling with connecting seats of said caliper body for a stable and rigid connection between the support element and the caliper body, wherein said brake caliper comprises a first pad and a second opposed pad; wherein
   a stiffening and support element connects the two support element tines;
   the stiffening and support element comprises a stiffening element resting surface for the resting and support of said second pad that, in operating conditions, abuts directly against said stiffening element resting surface;
   wherein said resting counter-surfaces are arranged on a plane which is substantially orthogonal to a radial direction passing through the rotational axis of the brake disc.

2. The brake caliper support element according to claim 1, wherein
   said stiffening and support element structurally combines with the caliper body, even though it remains partially separate, to form a second elongated element on a side of the caliper body facing away from a wheel so as to form a structural completion of the caliper body itself.

3. The brake caliper support element according to claim 1, wherein said tines converge away from said stiffening and support element for the connection to the caliper body.

4. The brake caliper support element according to claim 1, wherein each of said elements for the connection to the caliper body comprise at least a connecting element seat to receive fixing elements, in order to firmly connect the caliper body to said support element.

5. The brake caliper support element according to claim 1, wherein said support element is in a single piece with a motor vehicle front fork hub.

6. The brake caliper support element according to claim 1, wherein a wheel axle seat is provided in said support element.

7. The brake caliper support element according to claim 1, wherein a further support element arm is provided in said support element for the anchorage to a motorcycle swingarm.

8. The brake caliper support element according to claim 7, wherein a hooking portion for the further arm is provided at a free end of said further arm for the firm coupling with the swingarm.

* * * * *